(12) United States Patent
Wakimoto et al.

(10) Patent No.: US 11,158,902 B2
(45) Date of Patent: Oct. 26, 2021

(54) RECTANGULAR SECONDARY BATTERY

(71) Applicant: SANYO Electric Co., Ltd., Daito (JP)

(72) Inventors: Ryoichi Wakimoto, Hyogo (JP); Hiroyuki Yamada, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 265 days.

(21) Appl. No.: 16/342,733

(22) PCT Filed: Oct. 20, 2017

(86) PCT No.: PCT/JP2017/037928
§ 371 (c)(1),
(2) Date: Apr. 17, 2019

(87) PCT Pub. No.: WO2018/079423
PCT Pub. Date: May 3, 2018

(65) Prior Publication Data
US 2020/0052265 A1 Feb. 13, 2020

(30) Foreign Application Priority Data
Oct. 24, 2016 (JP) .............................. JP2016-207596

(51) Int. Cl.
*H01M 50/342* (2021.01)
*H01M 50/103* (2021.01)
(Continued)

(52) U.S. Cl.
CPC ....... *H01M 50/3425* (2021.01); *H01M 50/10* (2021.01); *H01M 50/103* (2021.01);
(Continued)

(58) Field of Classification Search
CPC .............................................. H01M 50/3425
See application file for complete search history.

(56) References Cited

U.S. PATENT DOCUMENTS

| 2004/0023115 A1* | 2/2004 | Kato ................... H01M 4/587 |
| | | 429/231.8 |
| 2006/0240290 A1* | 10/2006 | Holman ............ H01M 10/0436 |
| | | 429/3 |

(Continued)

FOREIGN PATENT DOCUMENTS

| JP | 3-263754 A | 11/1991 |
| JP | 2010-282850 A | 12/2010 |

(Continued)

OTHER PUBLICATIONS

EPO Website (www.espacenet.com) machine translation of the detailed description of JP 2015-159087A (Year: 2015).*

(Continued)

*Primary Examiner* — Gregg Cantelmo
(74) *Attorney, Agent, or Firm* — Westerman, Hattori, Daniels & Adrian, LLP

(57) ABSTRACT

To provide a highly reliable rectangular secondary battery. A rectangular secondary battery (20) includes: an electrode body (3) that includes a positive electrode plate and a negative electrode plate; a rectangular casing (1) that includes an opening and that contains the electrode body (3); and a sealing plate (2) that seals the opening of the rectangular casing (1). The sealing plate (2) includes a gas discharge valve (17) that ruptures when the pressure inside the rectangular casing (1) has a predetermined value or more to discharge gas inside the rectangular casing (1) to outside the rectangular casing (1). A portion of a second negative electrode current collector (8b) is disposed, as a shielding member, at a location that is between the sealing plate (2) and the electrode body (3) and that faces the gas discharge valve (17).

3 Claims, 15 Drawing Sheets

(51) Int. Cl.
*H01M 50/553* (2021.01)
*H01M 50/176* (2021.01)
*H01M 50/572* (2021.01)
*H01M 50/54* (2021.01)
*H01M 50/10* (2021.01)

(52) U.S. Cl.
CPC ......... *H01M 50/176* (2021.01); *H01M 50/54* (2021.01); *H01M 50/553* (2021.01); *H01M 50/572* (2021.01); *H01M 2200/20* (2013.01); *H01M 2220/20* (2013.01)

(56) References Cited

U.S. PATENT DOCUMENTS

| | | | |
|---|---|---|---|
| 2008/0318122 A1* | 12/2008 | Sun | H01M 50/116 429/156 |
| 2010/0266879 A1* | 10/2010 | Byun | H01M 4/70 429/53 |
| 2012/0088128 A1 | 4/2012 | Matsuura et al. | |
| 2015/0147605 A1 | 5/2015 | Kim et al. | |
| 2019/0115163 A1* | 4/2019 | Yamashita | H01G 11/78 |

FOREIGN PATENT DOCUMENTS

| | | |
|---|---|---|
| JP | 4881409 B2 | 2/2012 |
| JP | 2015-149161 A | 8/2015 |
| JP | 2015-159087 A | 9/2015 |
| WO | 2017/171002 A1 | 10/2017 |

OTHER PUBLICATIONS

International Search Report dated Jan. 23, 2018, issued in counterpart International Application No. PCT/JP2017/037928 (2 pages).

* cited by examiner

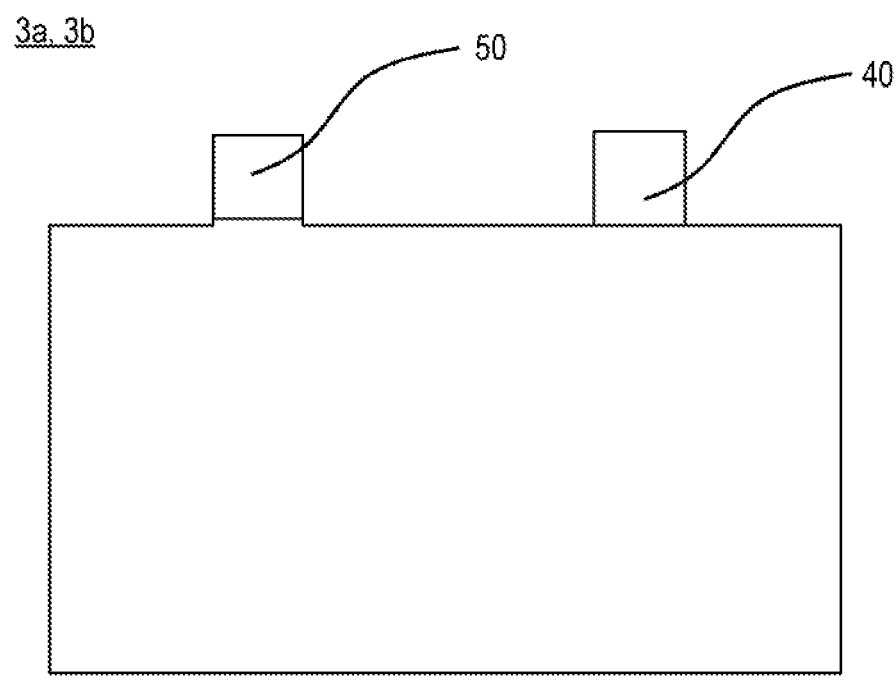
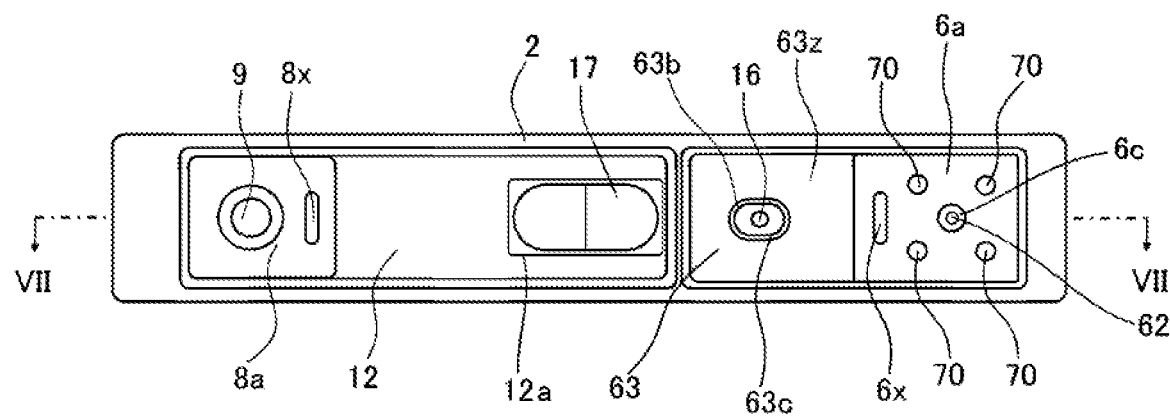

RECTANGULAR SECONDARY BATTERY

TECHNICAL FIELD

The present invention relates to a rectangular secondary battery.

BACKGROUND ART

Rectangular secondary batteries, such as alkaline secondary batteries and nonaqueous electrolyte secondary batteries, are used in drive power sources of electric vehicles (EV), hybrid electric vehicles (HEV, PHEV), and the like.

In these rectangular secondary batteries, a battery case is constituted by a bottomed cylindrical rectangular casing that includes an opening, and a sealing plate that seals the opening. An electrode body constituted by a positive electrode plate, a negative electrode plate, and a separator is contained, together with an electrolytic solution, in the battery case. A positive electrode terminal and a negative electrode terminal are attached to the sealing plate. The positive electrode terminal is electrically connected to the positive electrode plate via a positive electrode current collector, and the negative electrode terminal is electrically connected to the negative electrode plate via a negative electrode current collector.

The positive electrode plate includes a positive electrode core made of metal and a positive-electrode-active-material mixture layer formed on a surface of the positive electrode core. A positive-electrode-core exposure portion on which no positive-electrode-active-material mixture layer is formed is formed on a portion of the positive electrode core. The positive electrode current collector is connected to the positive-electrode-core exposure portion. The negative electrode plate includes a negative electrode core made of metal and a negative-electrode-active-material mixture layer formed on a surface of the negative electrode core. A negative-electrode-core exposure portion on which no negative-electrode-active-material mixture layer is formed is formed on a portion of the negative electrode core. The negative electrode current collector is connected to the negative-electrode-core exposure portion.

The battery case of the rectangular secondary battery includes a gas discharge valve that ruptures when the pressure inside the battery case has a predetermined value or more as a result of an abnormality occurring in the rectangular secondary battery to discharge gas inside the battery case to outside the battery case.

CITATION LIST

Patent Literature

PTL 1: Japanese Published Unexamined Patent Application No. 2015-149161

SUMMARY OF INVENTION

Technical Problem

In a rectangular secondary battery that has large battery capacity, when a gas discharge valve is activated as a result of the pressure inside a battery case increasing upon occurrence of an abnormality in the rectangular secondary battery, there is a possibility of high-temperature molten materials, sparks, and the like erupting from the gas discharge valve.

A main object of the present invention is to provide a highly reliable rectangular secondary battery.

Solution to Problem

A rectangular secondary battery according to one aspect of the present invention includes:

an electrode body that includes a positive electrode plate and a negative electrode plate;

a rectangular casing that includes an opening and that contains the electrode body;

a sealing plate that includes a gas discharge valve and that seals the opening; and a current collecting member that is electrically connected to the positive electrode plate or the negative electrode plate and that is disposed in the rectangular casing, in which a shielding member made of metal is disposed at a location that is between the gas discharge valve and the electrode body and that faces the gas discharge valve.

With such a configuration, it is possible to suppress high-temperature molten materials, sparks, and the like of the electrode body and the like from erupting from the gas discharge valve to outside the battery case when the gas discharge valve is activated as a result of an abnormality occurring in the rectangular secondary battery. Accordingly, the rectangular secondary battery has increased reliability. The shielding member does not necessarily face the gas discharge valve directly and may face the gas discharge valve with another member, for example, an insulating member or the like, interposed therebetween.

A portion of the current collecting member is usable as the shielding member. Consequently, it is possible to suppress, by a simpler method, high-temperature molten materials, sparks, and the like of the electrode body and the like from erupting from the gas discharge valve to outside the battery case.

A shielding member constituted by a component different from the current collecting member may be connected to a battery inner surface of the sealing plate. Consequently, it is possible to suppress with increased certainty high-temperature molten materials, sparks, and the like of the electrode body and the like from erupting from the gas discharge valve to outside the battery case.

Advantageous Effects of Invention

According to the present invention, it is possible to provide a rectangular secondary battery having increased reliability.

BRIEF DESCRIPTION OF DRAWINGS

FIG. 5 is a plan view of an electrode body element according to the embodiment.

FIG. 6 is a bottom view of a sealing plate after components are attached thereto.

DESCRIPTION OF EMBODIMENTS

A configuration of a rectangular secondary battery 20 according to an embodiment will be described below. The present invention is, however, not limited to the following embodiment.

Figure 1:
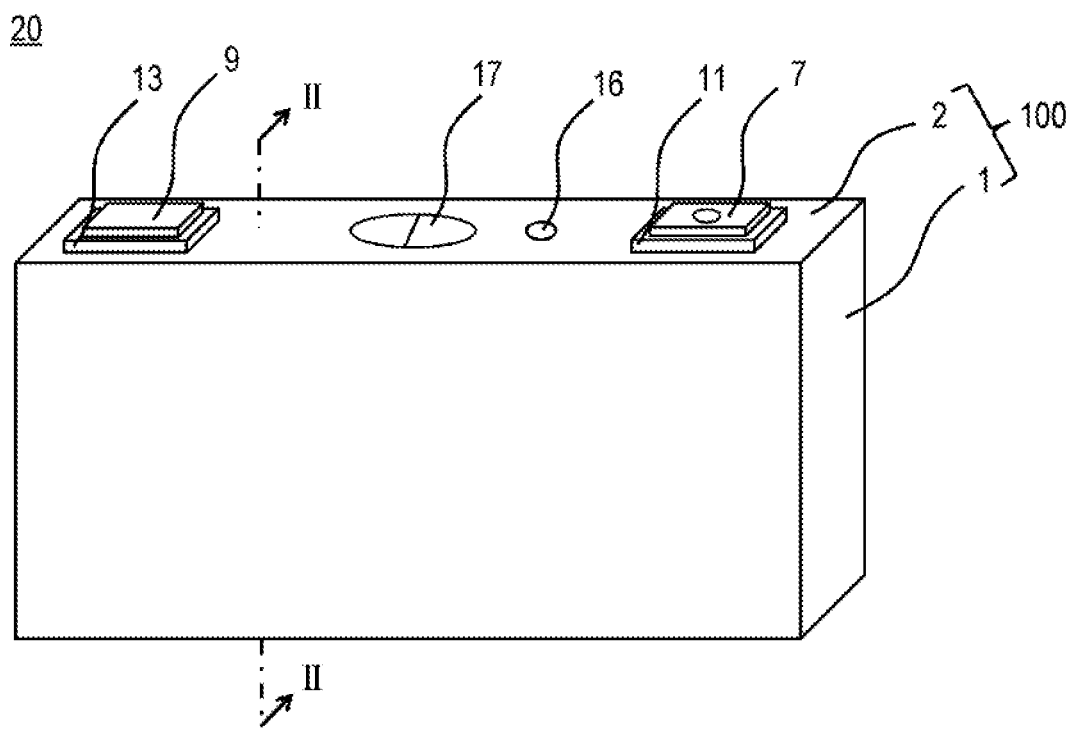
FIG. 1 is a perspective view of a rectangular secondary battery according to an embodiment.
Figure 2:
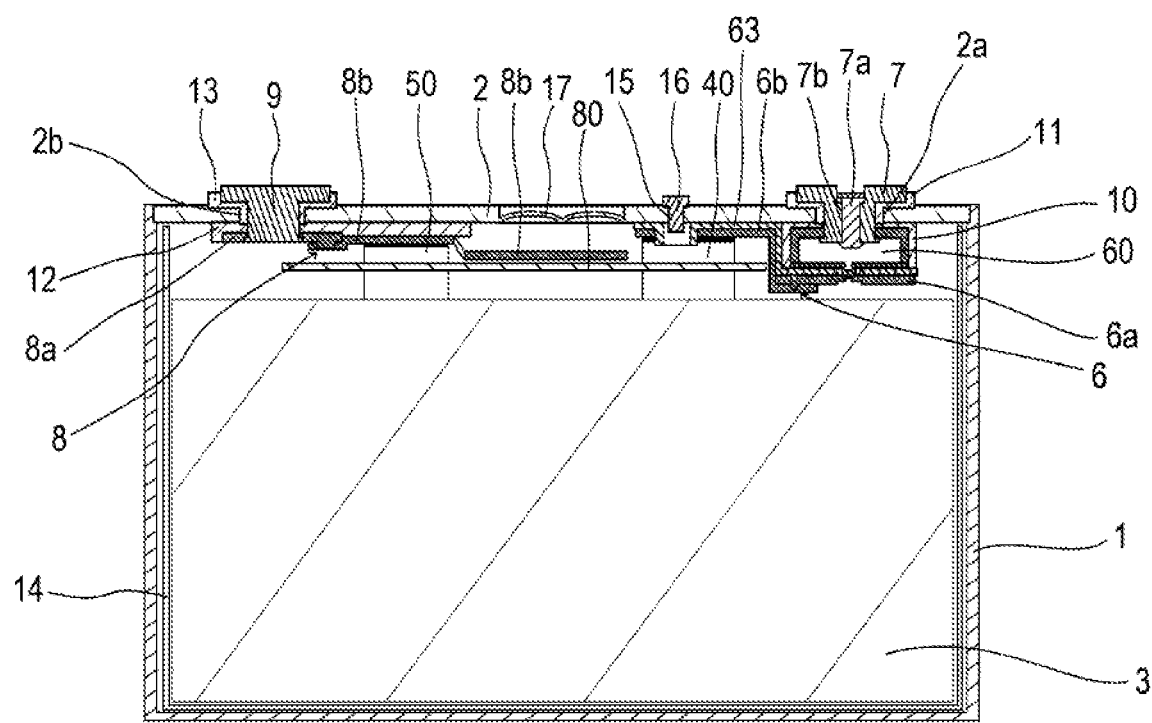
FIG. 2 is a sectional view taken along line II-II in FIG. 1.

FIG. 1 is a perspective view of the rectangular secondary battery 20. FIG. 2 is a sectional view taken along line II-II in FIG. 1. As illustrated in FIG. 1 and FIG. 2, the rectangular secondary battery 20 includes a battery case 100 constituted by a bottomed square-cylindrical rectangular casing 1 that includes an opening, and a sealing plate 2 that seals the opening of the rectangular casing 1. The rectangular casing 1 and the sealing plate 2 are each preferably made of metal and preferably made of, for example, aluminum or an aluminum alloy. A stack-type electrode body 3 including a plurality of positive electrode plates and a plurality of negative electrode plates that are stacked with a separator interposed therebetween is contained, together with an electrolytic solution, in the rectangular casing 1. An insulating sheet 14 made of resin is disposed between the electrode body 3 and the rectangular casing 1.

Positive electrode tabs 40 and negative electrode tabs 50 are disposed at an end portion of the electrode body 3 on the side of the sealing plate 2. The positive electrode tabs 40 are electrically connected to a positive electrode external terminal 7 via a second positive electrode current collector 6b and a first positive electrode current collector 6a. The negative electrode tabs 50 are electrically connected to a negative electrode external terminal 9 via a second negative electrode current collector 8b and a first negative electrode current collector 8a. The first positive electrode current collector 6a and the second positive electrode current collector 6b constitute a positive electrode current collecting member 6. The first negative electrode current collector 8a and the second negative electrode current collector 8b constitute a negative electrode current collecting member 8. The positive electrode current collecting member 6 may be a single component. The negative electrode current collecting member 8 also may be a single component.

The positive electrode external terminal 7 is fixed to the sealing plate 2 with an external insulating member 11 made of resin interposed therebetween. The negative electrode external terminal 9 is fixed to the sealing plate 2 with an external insulating member 13 made of resin interposed therebetween. The positive electrode external terminal 7 is preferably made of metal and more preferably made of aluminum or an aluminum alloy. The negative electrode external terminal 9 is preferably made of metal and more preferably made of copper or a copper alloy. The negative electrode external terminal 9 further preferably includes a portion made of copper or a copper alloy on the internal side of the battery case 100 and a portion made of aluminum or an aluminum alloy on the external side of the battery case 100. A surface of the negative electrode external terminal 9 is preferably provided with nickel plating or the like.

A conduction path between the positive electrode plates and the positive electrode external terminal 7 preferably includes a current interruption mechanism 60 that is activated when the pressure inside the battery case 100 has a predetermined value or more and that interrupts the conduction path between the positive electrode plates and the positive electrode external terminal 7. A conduction path between the negative electrode plates and the negative electrode external terminal 9 may include a current interruption mechanism.

The sealing plate 2 includes a gas discharge valve 17 that ruptures when the pressure inside the battery case 100 has a predetermined value or more to discharge gas inside the battery case 100 to outside the battery case 100. The wall thickness of the gas discharge valve 17 is thinner than that of other portions of the sealing plate 2. The gas discharge valve 17 may be formed by subjecting the sealing plate 2 to stamping. The gas discharge valve 17 may be formed by providing the sealing plate 2 with a through hole for a gas discharge valve and closing the through hole with a thin-wall valve. The activating pressure of the gas discharge valve 17 is set to a value greater than the activating pressure of the current interruption mechanism 60.

The sealing plate 2 includes an electrolytic solution injection hole 15. After an electrolytic solution is injected through the electrolytic solution injection hole 15 into the battery case 100, the electrolytic solution injection hole 15 is sealed with a sealing plug 16.

Next, a method of manufacturing the rectangular secondary battery 20 will be described.

[Production of Positive Electrode Plate]

Positive electrode slurry that contains a lithium-nickel-cobalt-manganese composite oxide as a positive electrode active material, polyvinylidene fluoride (PVdF) as a binding agent, a carbon material as a conducting agent, and N-methyl-2-pyrrolidone (NMP) as a dispersion medium is produced. The positive electrode slurry is applied onto both surfaces of rectangular aluminum foil, which serves as a positive electrode core, having a thickness of 15 µm. The positive electrode slurry is dried to remove N-methyl-2-pyrrolidone in the positive electrode slurry, thereby forming a positive-electrode-active-material mixture layer on the positive electrode core. Next, the positive-electrode-active-material mixture layer is subjected to compression processing so as to have a predetermined thickness. A thus-obtained positive electrode plate is cut into a predetermined shape.

Figure 3:
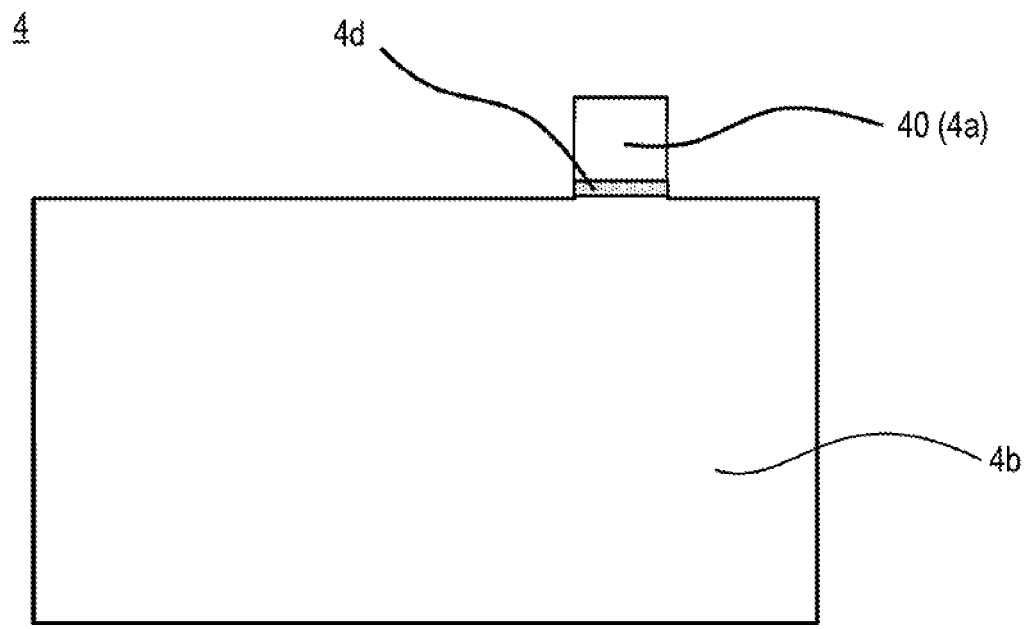
FIG. 3 is a plan view of a positive electrode plate according to the embodiment.

FIG. 3 is a plan view of a positive electrode plate 4 produced by the aforementioned method. As illustrated in FIG. 3, the positive electrode plate 4 includes a body portion that includes a rectangular positive electrode core 4a whose two surfaces are each provided with a positive-electrode-active-material mixture layer 4b. The positive electrode core 4a projects from an end of the body portion, and the projecting positive electrode core 4a constitutes the positive electrode tab 40. The positive electrode tab 40 may be a portion of the positive electrode core 4a, as illustrated in FIG. 3, or another member may be connected to the positive electrode core 4a so as to be the positive electrode tab 40. A positive electrode protection layer 4d that has electric resistance greater than the electric resistance of the positive-electrode-active-material mixture layer 4b is preferably disposed on a portion of the positive electrode tab 40 adjacent to the positive-electrode-active-material mixture layer 4b. The positive electrode protection layer 4d preferably contains ceramic particles of alumina, silica, zirconia, or the like and a binder. The positive electrode protection layer 4d further preferably contains conductive particles of a carbon material or the like.

[Production of Negative Electrode Plate]

Negative electrode slimy that contains graphite as a negative electrode active material, styrene-butadiene rubber (SBR) as a binding agent, carboxymethyl cellulose (CMC) as a thickening agent, and water is produced. The negative electrode slurry is applied onto both surfaces of rectangular copper foil, which serves as a negative electrode core, having a thickness of 8 µm. The negative electrode slurry is dried to remove water in the negative electrode slurry, thereby forming a negative-electrode-active-material mixture layer on the negative electrode core. Next, the negative-electrode-active-material mixture layer is subjected to compression processing so as to have a predetermined thickness. A thus-obtained negative electrode plate is cut into a predetermined shape.

Figure 4:
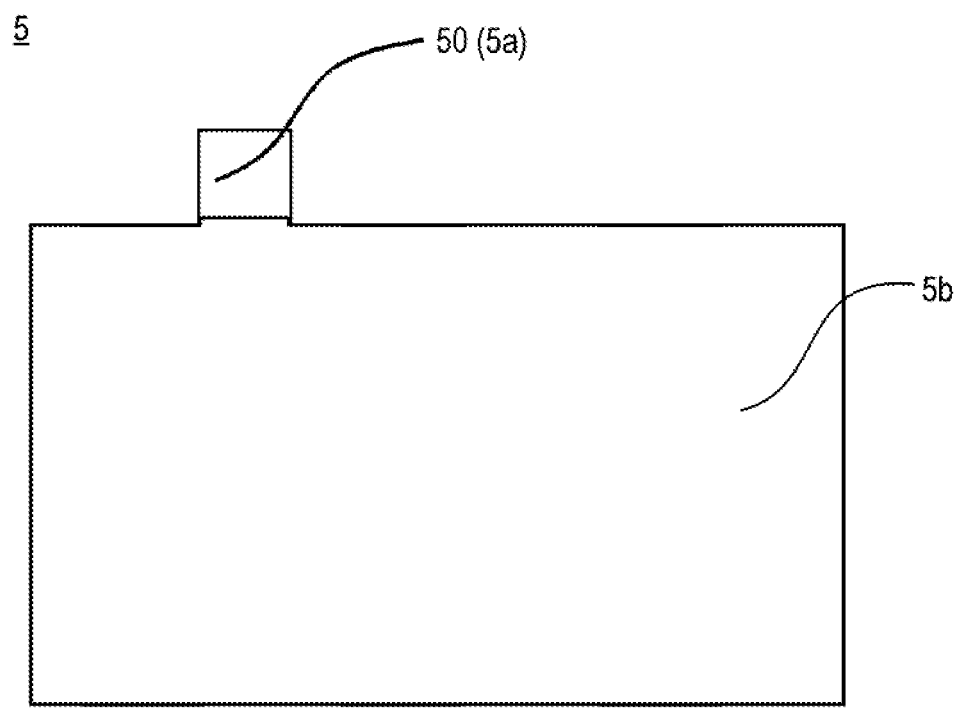
FIG. 4 is a plan view of a negative electrode plate according to the embodiment.

FIG. 4 is a plan view of a negative electrode plate 5 produced by the aforementioned method. As illustrated in FIG. 4, the negative electrode plate 5 includes a body portion that includes a rectangular negative electrode core 5a whose two surfaces are each provided with a negative-electrode-active-material mixture layer 5b. The negative electrode core 5a projects from an end of the body portion, and the projecting negative electrode core 5a constitutes the negative electrode tab 50. The negative electrode tab 50 may be a portion of the negative electrode core 5a, as illustrated in FIG. 4, or another member may be connected to the negative electrode core 5a so as to be the negative electrode tab 50.

[Production of Electrode Body Element]

In total, 50 plates of the positive electrode plate 4 and 51 plates of the negative electrode plate 5 are produced by the aforementioned method, and these electrode plates are stacked with a rectangular separator made of polyolefin interposed therebetween, thereby producing a stack-type electrode body element (3a, 3b). As illustrated in FIG. 5, the stack-type electrode body element (3a, 3b) is produced such that, at one end portion thereof, the positive electrode tabs 40 of the positive electrode plates 4 are stacked and the negative electrode tabs 50 of the negative electrode plates 5 are stacked. A separator is disposed on each of two outer surfaces of the electrode body element (3a, 3b), and the electrode plates and the separators are fixed in the stacked state with a tape or the like. Alternatively, an adhesive layer may be disposed on each separator so that the separators and the positive electrode plates 4 are bonded to each other and the separators and the negative electrode plates 5 are bonded to each other.

In plan view, the size of the separator is preferably equal to the size of the negative electrode plate 5 or larger than the size of the negative electrode plate 5. The positive electrode plates 4 and the negative electrode plates 5 may be stacked after each positive electrode plate 4 is disposed between two separators and the periphery of the separators is heat welded. The positive electrode plates 4 and the negative electrode plates 5 may be stacked by using a long separator to produce the electrode body element (3a, 3b) while bending the long separator into a meandering shape. In addition, the positive electrode plates 4 and the negative electrode plates 5 may be stacked by using a long separator while winding the long separator.

[Attachment of Components to Sealing Plate]

With reference to FIG. 2 and FIG. 6 to FIG. 8, a method of attaching the positive electrode external terminal 7 and the first positive electrode current collector 6a to the sealing plate 2, and a configuration of the current interruption mechanism 60 will be described.

The external insulating member 11 is disposed on the external side of a positive-electrode-terminal attachment hole 2a provided in the sealing plate 2, and an internal insulating member 10 and a cup-shaped conductive member 61 are disposed on the internal side of the positive-electrode-terminal attachment hole 2a. Next, the positive electrode external terminal 7 is inserted into each of a through hole of the external insulating member 11, the positive-electrode-terminal attachment hole 2a of the sealing plate 2, a through hole of the internal insulating member 10, and a through hole of the conductive member 61. Next, a leading end of the positive electrode external terminal 7 is crimped onto the conductive member 61. Consequently, the positive electrode external terminal 7, the external insulating member 11, the sealing plate 2, the internal insulating member 10, and the conductive member 61 are fixed to each other. The crimped portion of the positive electrode external terminal 7 and the conductive member 61 are preferably welded to each other by laser welding or the like. The internal insulating member 10 and the external insulating member 11 are preferably each made of resin.

The conductive member 61 includes an open portion on the side of the electrode body 3. A disc-shaped deformation plate 62 is disposed so as to close the open portion of the conductive member 61, and the periphery of the deformation plate 62 is connected to the conductive member 61 by welding. Consequently, the open portion of the conductive member 61 is sealed with the deformation plate 62. The conductive member 61 and the deformation plate 62 are preferably each made of metal and more preferably each made of aluminum or an aluminum alloy.

Next, a third insulating member 63 made of resin is disposed on the side of the electrode body 3 with respect to the deformation plate 62. Preferably, the third insulating member 63 includes a connection portion, and the connection portion is connected to the internal insulating member 10. Preferably, the third insulating member 63 includes a claw-shaped hook-fixing portion, the conductive member 61 includes a flange portion, a recessed portion, or a projecting portion, and the hook-fixing portion of the third insulating member 63 is fixed to the flange portion, the recessed portion, or the projecting portion of the conductive member 61.

The third insulating member 63 includes a fixing projection on a surface thereof on the side of the electrode body 3. The third insulating member 63 preferably includes an insulating member first region 63x disposed below the deformation plate 62, an insulating member second region 63y extending from an end portion of the insulating member first region 63x toward the sealing plate 2, and an insulating member third region 63z extending from an end portion of the insulating member second region 63y along the sealing plate 2. The insulating member third region 63z includes an insulating member opening 63b at a location that faces the electrolytic solution injection hole 15 of the sealing plate 2. An insulating member projection 63c that projects toward the electrode body 3 is disposed at an edge portion of the insulating member opening 63b.

Next, the first positive electrode current collector 6a is disposed on the side of the electrode body 3 with respect to the third insulating member 63. The first positive electrode current collector 6a includes a fixing through hole. The fixing projection of the third insulating member 63 is inserted into the fixing through hole of the first positive electrode current collector 6a, and the diameter of the leading end of the fixing projection is expanded to fix the third insulating member 63 and the first positive electrode current collector 6a to each other. Consequently, a fixed portion 70 is formed. As illustrated in FIG. 6, the fixed portion 70 is preferably formed at each of four locations so as to surround a connected portion at which the deformation plate 62 and the first positive electrode current collector 6a are connected to each other.

Next, the deformation plate 62 and the first positive electrode current collector 6a are connected to each other by welding through a through hole provided in the third insulating member 63. Preferably, the first positive electrode current collector 6a includes a thin-wall portion 6c and connected at the thin-wall portion 6c to the deformation plate 62 by welding. Preferably, the thin-wall portion 6c includes an opening at the center thereof, and an edge portion of the opening is connected to the deformation plate 62 by welding. More preferably, the thin-wall portion 6c includes an annular notched portion that is provided so as to surround the connected portion at which the first positive electrode current collector 6a and the deformation plate 62 are connected to each other.

When the pressure inside the battery case 100 has a predetermined value or more, the deformation plate 62 deforms such that a center portion of the deformation plate 62 moves upward (toward the positive electrode external terminal 7). Upon the deformation of the deformation plate 62, the thin-wall portion 6c of the first positive electrode current collector 6a ruptures. Consequently, the conduction path between the positive electrode plates 4 and the positive electrode external terminal 7 is cut off.

The positive electrode external terminal 7 may include a terminal through hole 7b, and a gas may be injected into the current interruption mechanism 60 through the terminal through hole 7b to check for leakage of the connected portion at which the conductive member 61 and the deformation plate 62 are connected to each other. In addition, the deformation plate 62 and the first positive electrode current collector 6a may be connected to each other by welding in a state in which the deformation plate 62 is pressed against the first positive electrode current collector 6a by a gas. The terminal through hole 7b is finally sealed with a terminal sealing member 7a. The terminal sealing member 7a preferably includes a metal member 7x and a rubber member 7y.

The first positive electrode current collector 6a includes a current collector projection 6x on a surface thereof on the side of the electrode body 3.

With reference to FIG. 2, FIG. 6, FIG. 7, and FIG. 9, a method of attaching the negative electrode external terminal 9 and the first negative electrode current collector 8a to the sealing plate 2 will be described.

The external insulating member 13 is disposed on the external side of a negative-electrode-terminal attachment hole 2b provided in the sealing plate 2, and an internal insulating member 12 and the first negative electrode current collector 8a are disposed on the internal side of the negative-electrode-terminal attachment hole 2b. Next, the negative electrode external terminal 9 is inserted into each of a through hole of the external insulating member 13, the negative-electrode-terminal attachment hole 2b of the sealing plate 2, a through hole of the internal insulating member 12, and a through hole of the first negative electrode current collector 8a. Next, a leading end of the negative electrode external terminal 9 is crimped onto the first negative electrode current collector 8a. Consequently, the external insulating member 13, the sealing plate 2, the internal insulating member 12, and the first negative electrode current collector 8a are fixed to each other. The crimped portion of the negative electrode external terminal 9 and the first negative electrode current collector 8a are preferably welded to each other by laser welding or the like. The internal insulating member 12 and the external insulating member 13 are preferably each made of resin.

[Connection Between Second Current Collectors and Tabs]

Figure 10:
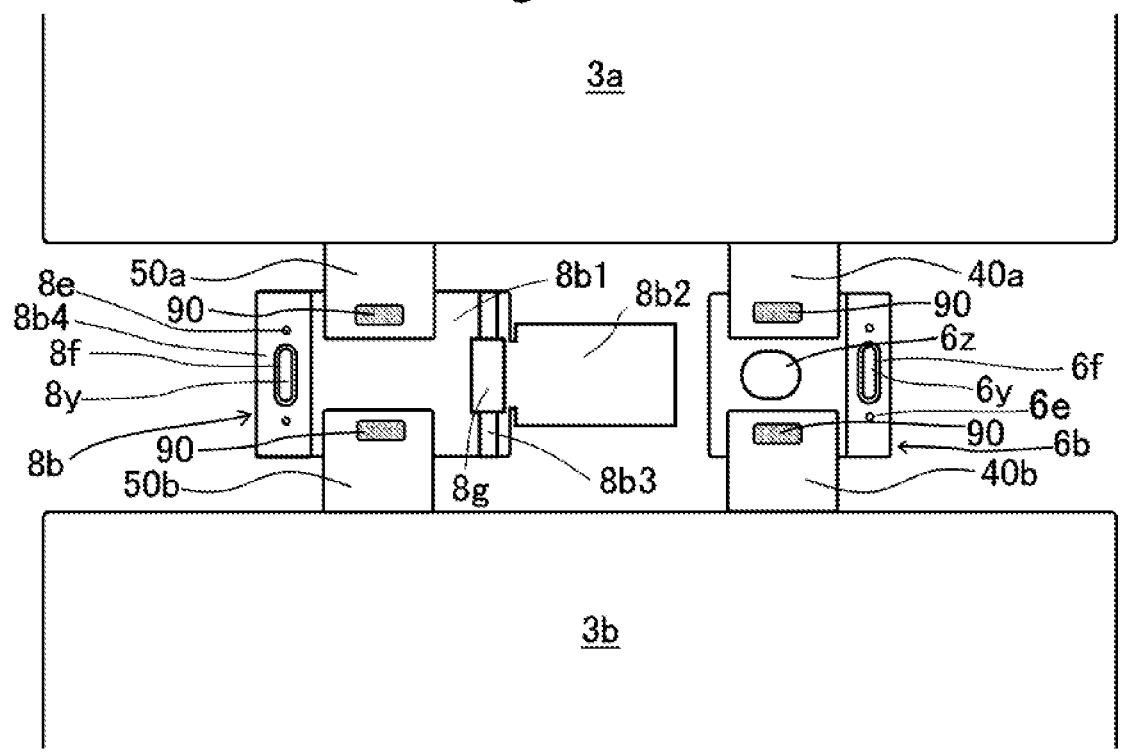
FIG. 10 is a view illustrating a step of connecting tabs to second current collectors.

FIG. 10 is a view illustrating a method of connecting the positive electrode tabs 40 to the second positive electrode current collector 6b and a method of connecting the negative electrode tabs 50 to the second negative electrode current collector 8b. Two electrode body elements are produced as a first electrode body element 3a and a second electrode body element 3b by the aforementioned method. The first electrode body element 3a and the second electrode body element 3b may have a completely identical configuration or may have different configurations. A plurality of the positive electrode tabs 40 of the first electrode body element 3a constitute a first positive electrode tab group 40a. A plurality of the negative electrode tabs 50 of the first electrode body element 3a constitute a first negative electrode tab group

50*a*. A plurality of the positive electrode tabs 40 of the second electrode body element 3*b* constitute a second positive electrode tab group 40*b*. A plurality of the negative electrode tabs 50 of the second electrode body element 3*b* constitute a second negative electrode tab group 50*b*.

The second positive electrode current collector 6*b* and the second negative electrode current collector 8*b* are disposed between the first electrode body element 3*a* and the second electrode body element 3*b*. Next, the first positive electrode tab group 40*a* constituted by the plurality of stacked positive electrode tabs 40 projecting from the first electrode body element 3*a* is disposed on the positive electrode current collector 6*b*, and the first negative electrode tab group 50*a* constituted by the plurality of stacked negative electrode tabs 50 projecting from the first electrode body element 3*a* is disposed on the second negative electrode current collector 8*b*. In addition, the second positive electrode tab group 40*b* constituted by the plurality of stacked positive electrode tabs 40 projecting from the second electrode body element 3*b* is disposed on the second positive electrode current collector 6*b*, and the second negative electrode tab group 50*b* constituted by the plurality of stacked negative electrode tabs 50 projecting from the second electrode body element 3*b* is disposed on the second negative electrode current collector 8*b*. The first positive electrode tab group 40*a* and the second positive electrode tab group 40*b* are each connected to the second positive electrode current collector 6*b* by welding, thereby forming a welded connection portion 90. The first negative electrode tab group 50*a* and the second negative electrode tab group 50*b* are each connected to the second negative electrode current collector 8*b* by welding, thereby forming a welded connection portion 90. Welding connection may be performed as follows.

The stacked tabs (the first positive electrode tab group 40*a*, the second positive electrode tab group 40*b*, the first negative electrode tab group 50*a*, and the second negative electrode tab group 50*b*) and the current collectors (the second positive electrode current collector 6*b* and the second negative electrode current collector 8*b*) are held from above and from below between welding jigs and subjected to welding. The welding method is preferably ultrasonic welding or resistance welding. Consequently, the stacked tabs and the current collectors are connected to each other by welding with increased certainty. It is possible to form a welded connection portion having increased reliability by using ultrasonic welding or resistance welding, compared to laser welding and the like, because, when a large number of tabs are stacked, for example, when the stacked number is 20 or more, welding can be performed in a state in which the tabs and the current collectors are held between a pair of welding jigs. The pair of welding jigs is a pair of resistance-welding electrodes in resistance welding and is a horn and an anvil in ultrasonic welding. The tabs (the first positive electrode tab group 40*a*, the second positive electrode tab group 40*b*, the first negative electrode tab group 50*a*, and the second negative electrode tab group 50*b*) and the current collectors (the second positive electrode current collector 6*b* and the second negative electrode current collector 8*b*) may be connected to each other by laser welding.

The first positive electrode tab group 40*a* of the first electrode body element 3*a* is connected to the second positive electrode current collector 6*b* so as to be on one side with respect to a center portion of the second positive electrode current collector 6*b* in the width direction. The second positive electrode tab group 40*b* of the second electrode body element 3*b* is connected to the second positive electrode current collector 6*b* so as to be on the other side with respect to the center portion of the second positive electrode current collector 6*b* in the width direction.

The first negative electrode tab group 50*a* of the second electrode body element 3*b* is connected to the second negative electrode current collector 8*b* so as to be on the one side with respect to a center portion of the second negative electrode current collector 8*b* in the width direction. The second negative electrode tab group 50*b* of the second electrode body element 3*b* is connected to the second positive electrode current collector 6*b* so as to be on the other side with respect to the center portion of the second positive electrode current collector 6*b* in the width direction.

As illustrated in FIG. 10, the second positive electrode current collector 6*b* includes an open portion 6*z*. After the second positive electrode current collector 6*b* is connected to the first positive electrode current collector 6*a*, the open portion 6*z* is disposed at a location corresponding to the electrolytic solution injection hole 15 provided in the sealing plate 2. The first positive electrode tab group 40*a* of the first electrode body element 3*a* is connected so as to be on the one side with respect to the open portion 6*z* in the width direction of the second positive electrode current collector 6*b*. The second positive electrode tab group 40*b* of the second electrode body element 3*b* is connected so as to be on the other side with respect to the open portion 6*z* in the width direction of the second positive electrode current collector 6*b*. When the second positive electrode current collector 6*b*, the first positive electrode tab group 40*a*, and the second positive electrode tab group 40*b* are viewed in a direction perpendicular to the sealing plate 2, a portion of each of the first positive electrode tab group 40*a* and the second positive electrode tab group 40*b*, the portion being disposed substantially parallel to the second positive electrode current collector 6*b*, preferably does not overlap the open portion 6*z*. Consequently, it is possible to prevent the second positive electrode current collector 6*b*, the first positive electrode tab group 40*a*, or the second positive electrode tab group 40*b* from obstructing injection of the electrolytic solution.

The step of fixing the first positive electrode current collector 6*a* and the first negative electrode current collector 8*a* to the sealing plate 2 and the step of connecting the positive electrode tabs 40 and the negative electrode tabs 50 to the second positive electrode current collector 6*b* and the second negative electrode current collector 8*b*, respectively, may be performed in any order.

[Connection Between First Positive Electrode Current Collector and Second Positive Electrode Current Collector]

Figure 7:
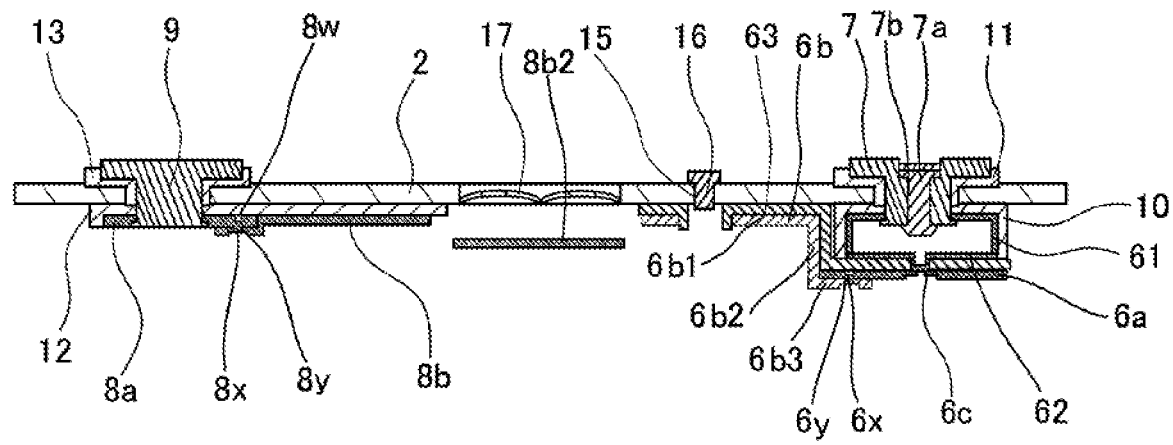
FIG. 7 is a sectional view taken along line VII-VII in FIG. 6.
Figure 8:
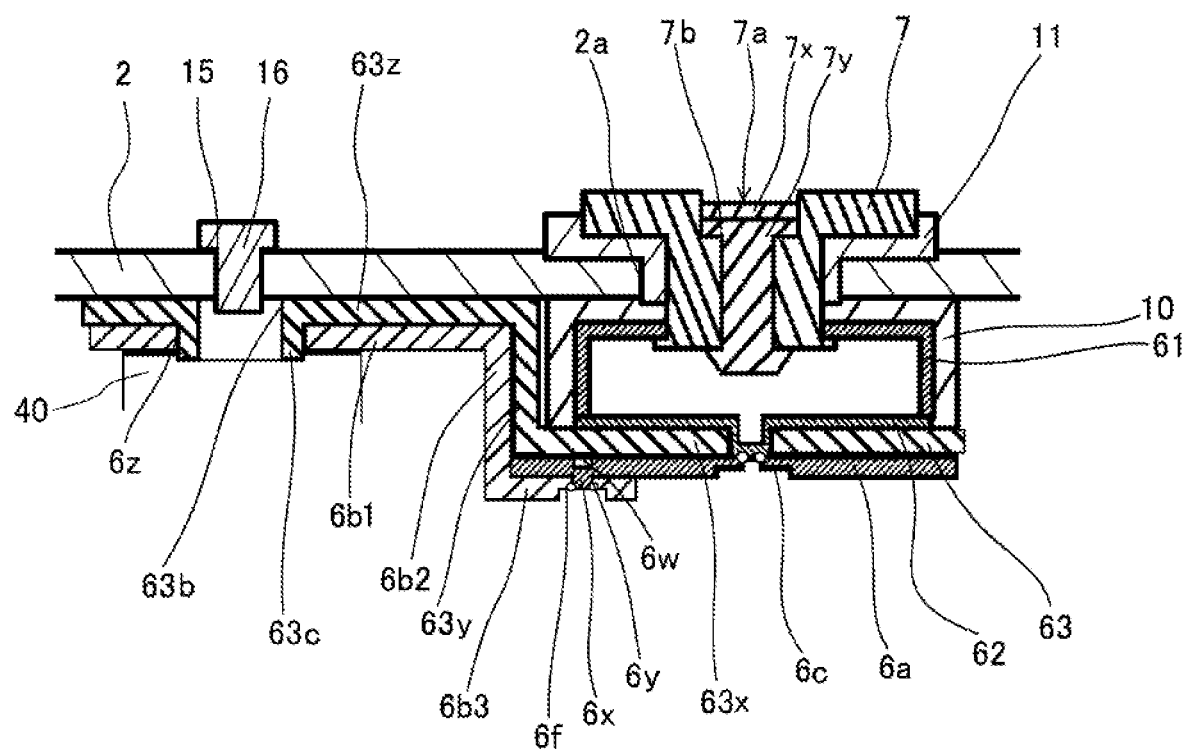
FIG. 8 is an enlarged view in the vicinity of a first positive electrode current collector, a second positive electrode current collector, and a current interruption mechanism in FIG. 7.

As illustrated in FIG. 6 and FIG. 7, the first positive electrode current collector 6*a* includes the current collector projection 6*x*. In addition, as illustrated in FIG. 10, the second positive electrode current collector 6*b* includes a current collector opening 6*y*. As illustrated in FIG. 7 and FIG. 8, the second positive electrode current collector 6*b* is disposed on the third insulating member 63 such that the current collector projection 6*x* of the first positive electrode current collector 6*a* is located inside the current collector opening 6*y* of the second positive electrode current collector 6*b*. Next, the current collector projection 6*x* of the first positive electrode current collector 6*a* and an edge portion of the current collector opening 6*y* of the second positive electrode current collector 6*b* are welded to each other by irradiation with an energy ray of laser or the like. Consequently, the first positive electrode current collector 6*a* and the second positive electrode current collector 6*b* are connected to each other. A current collector first recessed portion 6*f* is provided around the current collector opening 6y of the second positive electrode current collector 6b. In other words, the current collector opening 6y is formed at the center of the current collector first recessed portion 6f. The first positive electrode current collector 6a and the second positive electrode current collector 6b are connected to each other by welding at the current collector first recessed portion 6f.

As illustrated in FIG. 8, the second positive electrode current collector 6b includes a current collector first region 6b1, a current collector second region 6b2, and a current collector third region 6b3. The positive electrode tabs 40 are connected to the current collector first region 6b1. The first positive electrode current collector 6a is connected to the current collector third region 6b3. The current collector second region 6b2 connects the current collector first region 6b1 and the current collector third region 6b3 to each other. In the direction perpendicular to the sealing plate 2, the distance between the sealing plate 2 and the current collector first region 6b1 is smaller than the distance between the sealing plate 2 and the current collector third region 6b3. With such a configuration, a space occupied by the current collectors is reduced, and the rectangular secondary battery has increased energy density.

As illustrated in FIG. 10, in the second positive electrode current collector 6b, a target hole 6e is provided on each of two sides of the current collector opening 6y. The target holes 6e are preferably used as targets for image correction when the first positive electrode current collector 6a and the second positive electrode current collector 6b are welded to each other by irradiation with an energy ray of laser or the like. Preferably, an image of the target holes 6e is detected, position correction is performed, and irradiation with an energy ray is performed along the shape of the current collector opening 6y. The target holes 6e may not be through holes and may be recessed portions. The area of the target holes 6e in plan view is preferably smaller than the area of the current collector opening 6y in plan view. The current collector opening 6y and the target holes 6e are preferably disposed adjacent to each other on a straight line in the width direction of the second positive electrode current collector 6b.

As illustrated in FIG. 8, a surface of the first positive electrode current collector 6a facing the third insulating member 63 includes a current collector second recessed portion 6w on the back side of the current collector projection 6x. Consequently, a larger welded connection portion is easily formed between the first positive electrode current collector 6a and the second positive electrode current collector 6b, which is preferable. As a result of the current collector second recessed portion 6w being formed, it is possible to prevent the third insulating member 63 from being damaged due to heat during welding when the first positive electrode current collector 6a and the second positive electrode current collector 6b are connected to each other by welding.

As illustrated in FIG. 8, a leading end of the third insulating member 63 on the lower side (on the side of the electrode body 3) of the insulating member projection 63c preferably projects, at the second positive electrode current collector 6b, downward (toward the electrode body 3) from the lower surface around the open portion 6z. Consequently, it is possible to prevent with certainty the sealing plug 16 and the second positive electrode current collector 6b from coming into contact with each other. The insulating member projection 63c preferably has an annular shape. However, the insulating member projection 63c does not necessarily have an annular shape and may have a shape in which a portion is notched.

[Connection Between First Negative Electrode Current Collector and Second Negative Electrode Current Collector]

Figure 11:
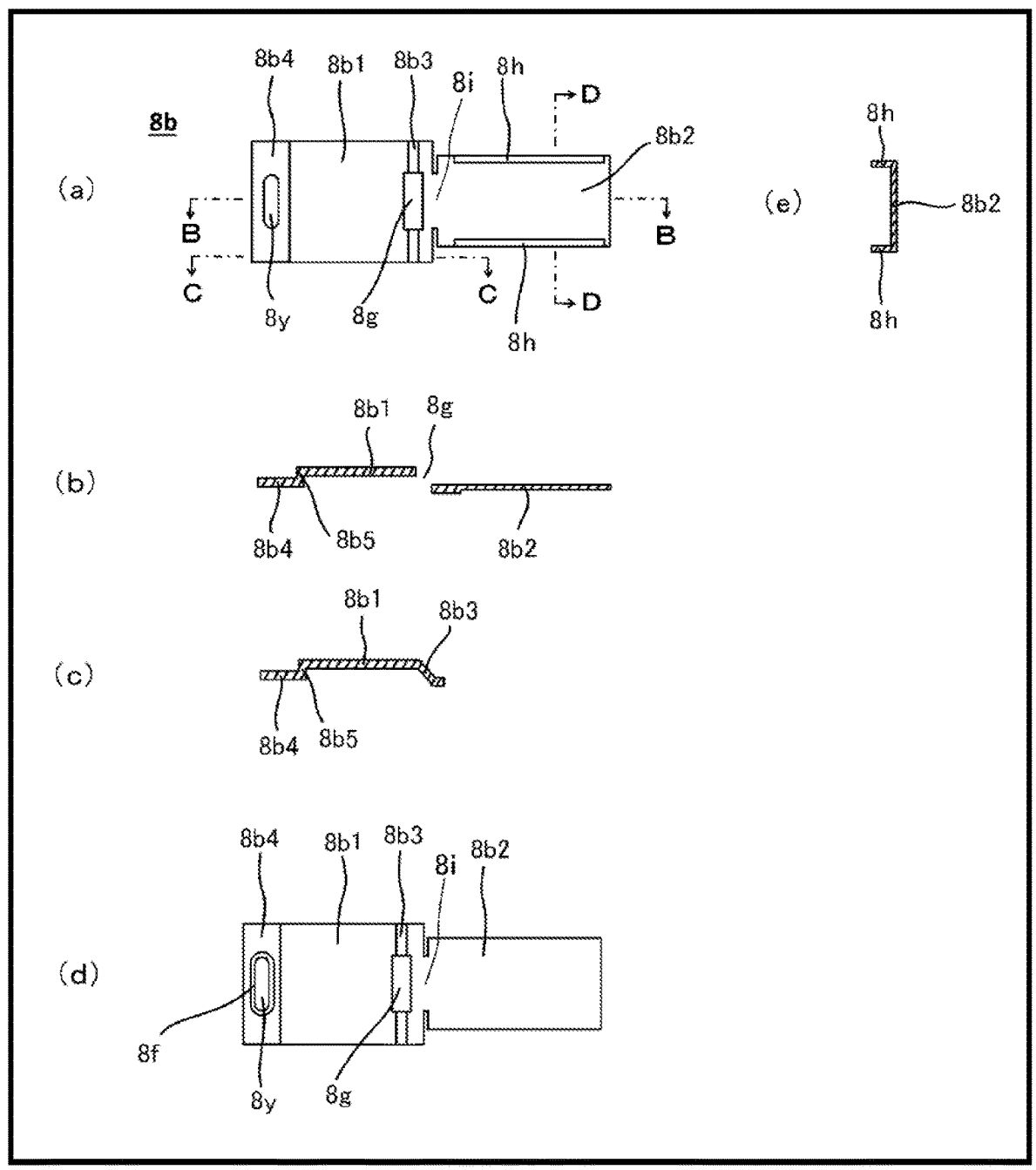
FIG. 11 is a view illustrating the second negative electrode current collector.

First, a configuration of the second negative electrode current collector 8b will be described with reference to FIG. 11. In FIG. 11, (a) is a top view of the second negative electrode current collector 8b, (b) is a sectional view taken along line B-B in (a), (c) is a sectional view taken along line C-C in (a), (d) is a bottom view of the second negative electrode current collector 8b, and (e) is a sectional view taken along line D-D in (a).

As illustrated in FIG. 11, the second negative electrode current collector 8b includes a current collector first region 8b1, a current collector second region 8b2, a current collector third region 8b3, a current collector fourth region 8b4, and a current collector fifth region 8b5.

The negative electrode tabs 50 are connected to the current collector first region 8b1 by welding. The current collector second region 8b2 is disposed at a location that faces the gas discharge valve 17. The current collector third region 8b3 connects the current collector first region 8b1 and the current collector second region 8b2 to each other. In the rectangular secondary battery 20, the current collector first region 8b1 and the current collector second region 8b2 are disposed substantially parallel to the sealing plate 2. For example, inclination of each of the current collector first region 8b1 and the current collector second region 8b2 with respect to the sealing plate 2 is preferably within a range of −15° to 15°. In the direction perpendicular to the sealing plate 2, the distance between the sealing plate 2 and the current collector first region 8b1 is smaller than the distance between the sealing plate 2 and the current collector second region 8b2. In other words, in the direction perpendicular to the sealing plate 2, the current collector first region 8b1 is located closer than the current collector second region 8b2 to the sealing plate 2. The current collector third region 8b3 is disposed so as to incline with respect to the sealing plate 2. The current collector third region 8b3 includes a vent hole 8g. The vent hole 8g connects a space between the gas discharge valve 17 and the current collector second region 8b2 and a space between the negative electrode current collecting member 8 and the electrode body 3 to each other. Accordingly, gas generated inside the electrode body 3 is able to flow from the electrode body 3 toward the gas discharge valve 17 through the vent hole 8g. The vent hole 8g is preferably formed so as to span the current collector first region 8b1 and the current collector second region 8b2.

The first negative electrode current collector 8a is connected to the current collector fourth region 8b4. The current collector fifth region 8b5 connects the current collector first region 8b1 and the current collector fourth region 8b4 to each other. In the rectangular secondary battery 20, the current collector fourth region 8b4 is disposed substantially parallel to the sealing plate 2. In the direction perpendicular to the sealing plate 2, the distance between the sealing plate 2 and the current collector first region 8b1 is smaller than the distance between the sealing plate 2 and the current collector fourth region 8b4. In the direction perpendicular to the sealing plate 2, the distance between the sealing plate 2 and the current collector fourth region 8b4 is smaller than the distance between the sealing plate 2 and the current collector second region 8b2.

The second negative electrode current collector 8b may be connected to the negative electrode external terminal 9 without using the first negative electrode current collector 8a. In this case, the negative electrode external terminal 9 may be connected to the current collector first region 8b1 without providing the current collector fourth region 8b4 and the current collector fifth region 8b5.

The current collector second region 8b2 corresponds to a shielding member made of metal disposed at a location that is between the gas discharge valve 17 and the electrode body 3 and that faces the gas discharge valve 17.

The second negative electrode current collector 8b includes, at the current collector second region 8b2, shielding member wall portions 8h extending toward the sealing plate 2. The shielding member wall portion 8h is provided at each of two ends of the current collector second region 8b2 in the lateral direction of the sealing plate 2. Due to the current collector second region 8b2 including the shielding member wall portions, it is possible to prevent the current collector second region 8b2 from closing the gas discharge valve 17 as a result of the current collector second region 8b2 moving toward the sealing plate 2. The second negative electrode current collector 8b is preferably formed by bending a plate material. In this case, the shielding member wall portions 8h are formed so as to bend at end portions of the current collector second region 8b2.

The current collector fourth region 8b4 of the second negative electrode current collector 8b includes a current collector opening 8y and a current collector first recessed portion 8f.

The current collector second region 8b2 includes a region whose thickness is thinner than the thickness of the current collector first region 8b1. Consequently, the volume occupied by the current collector second region 8b2, which serves as the shielding member, is reduced, and it is thus possible to discharge gas more effectively.

Figure 9:
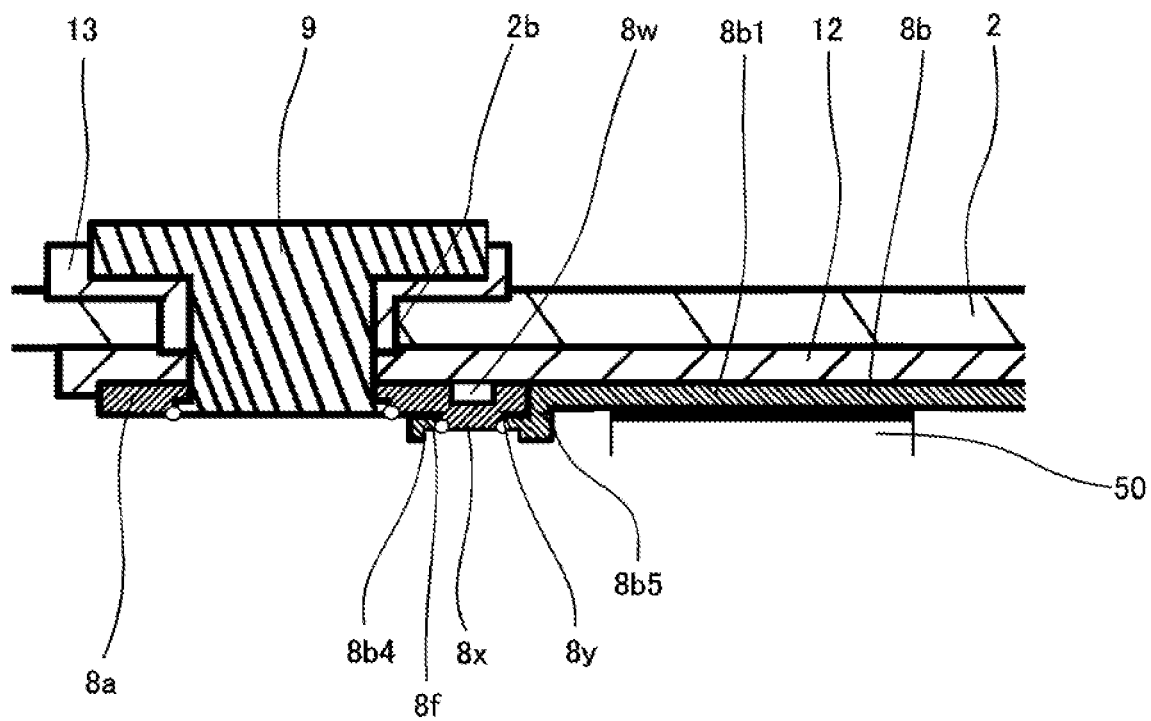
FIG. 9 is an enlarged view in the vicinity of a first negative electrode current collector and a second negative electrode current collector in FIG. 7.

As illustrated in FIG. 6 and FIG. 7, the first negative electrode current collector 8a includes a current collector projection 8x. As illustrated in FIG. 9 and FIG. 10, the second negative electrode current collector 8b includes the current collector opening 8y. As illustrated in FIG. 9, the second negative electrode current collector 8b is disposed on the internal insulating member 12 such that the current collector projection 8x of the first negative electrode current collector 8a is located inside the current collector opening By of the second negative electrode current collector 8b. Next, the current collector projection 8x of the first negative electrode current collector 8a and an edge portion of the current collector opening 8y of the second negative electrode current collector 8b are welded to each other by irradiation with an energy ray of laser or the like. Consequently, the first negative electrode current collector 8a and the second negative electrode current collector 8b are connected to each other. As illustrated in FIG. 10, the current collector first recessed portion 8f is provided around the current collector opening 8y of the second negative electrode current collector 8b. In other words, the current collector opening 8y is formed at the center of the current collector first recessed portion 8f. In the current collector first recessed portion 8f, the first negative electrode current collector 8a and the second negative electrode current collector 8b are connected to each other by welding. As with the second positive electrode current collector 6b, the second negative electrode current collector 8b includes target holes 8e.

As illustrated in FIG. 9, a surface of the first negative electrode current collector 8a facing the internal insulating member 12 includes a current collector second recessed portion 8w on the back side of the current collector projection 8x. Consequently, a larger welded connection portion is easily formed between the first negative electrode current collector 8a and the second negative electrode current collector 8b, which is preferable. As a result of the current collector second recessed portion 8w being formed, it is possible to prevent the internal insulating member 12 from being damaged due to heat during welding when the first negative electrode current collector 8a and the second negative electrode current collector 8b are connected to each other by welding.

Each of the current collector projection 6x and the current collector projection 8x preferably does not have a perfect circular shape and preferably has a rectangular shape, an oval shape, or a track shape.

<Connection Between First Insulating Member and Second Insulating Member>

The first insulating member and the second insulating member are preferably connected to each other after the positive electrode tabs 40 and the positive electrode external terminal 7 are electrically connected to each other and the negative electrode tabs 50 and the negative electrode external terminal 9 are electrically connected to each other, as described above.

Figure 12:
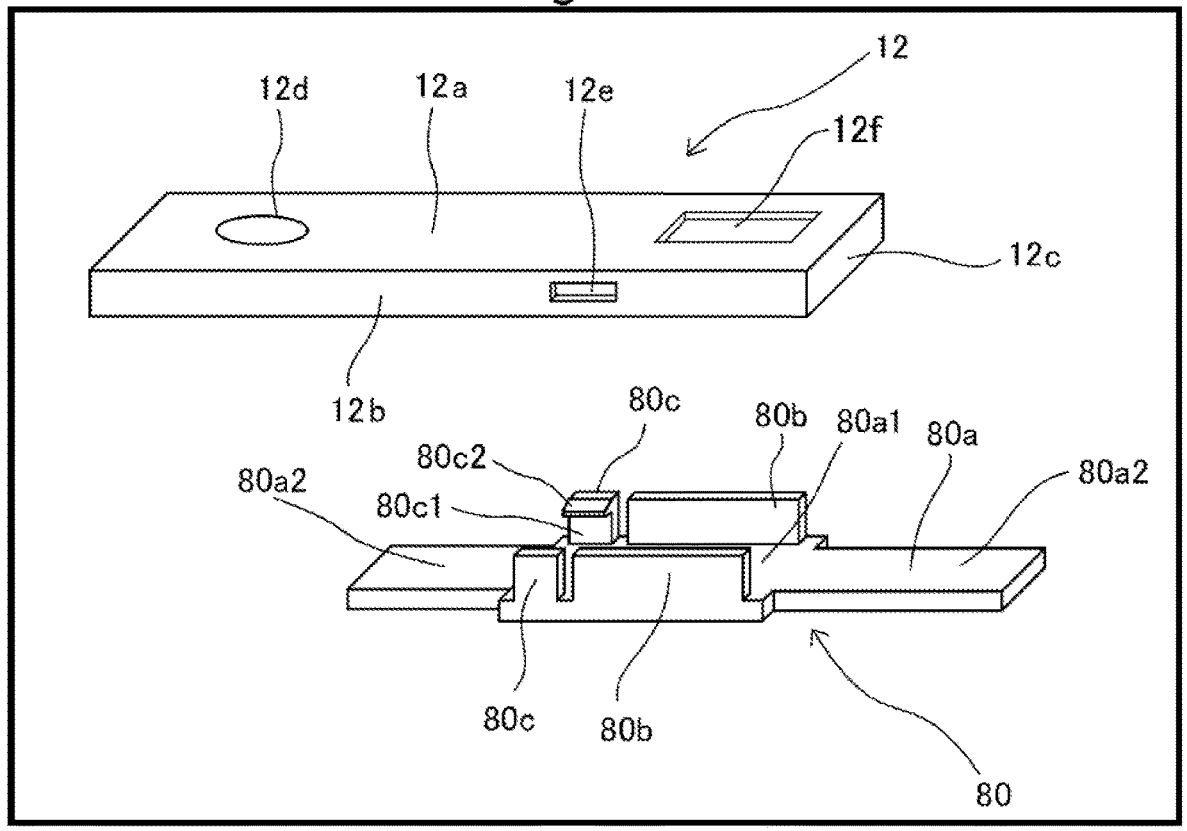
FIG. 12 is a perspective view of a first insulating member and a second insulating member.

FIG. 12 is a perspective view of the internal insulating member 12, as the first insulating member, and a second insulating member 80. The internal insulating member 12 includes a first insulating member body portion 12a facing an inner surface of the sealing plate 2. The first insulating member body portion 12a preferably has a plate shape. The first insulating member body portion 12a includes a through hole 12d, and the negative electrode external terminal 9 is inserted into the through hole 12d. A pair of first side walls 12b projecting toward the electrode body 3 are disposed one at each of two ends of the first insulating member body portion 12a of the internal insulating member 12 in the lateral direction. Respective outer surfaces of the pair of first side walls 12b each includes a connection recessed portion 12e. In addition, a pair of second side walls 12c projecting toward the electrode body 3 are disposed one at each of two ends of the first insulating member body portion 12a of the internal insulating member 12 in the longitudinal direction. The first insulating member body portion 12a includes an opening 12f in a portion thereof facing the gas discharge valve 17.

The second insulating member 80 includes a second insulating member body portion 80a disposed so as to face the sealing plate 2. The second insulating member body portion 80a is disposed between the sealing plate 2 and the electrode body 3. The second insulating member body portion 80a includes a wide portion 80a1 at the center in the longitudinal direction of the sealing plate 2 and includes a narrow portion 80a2 provided on each of two sides of the wide portion 80a1, the narrow portions 80a2 each having a width smaller than the width of the wide portion 80a1. A pair of side walls 80b extending from the second insulating member body portion 80a toward the sealing plate 2 are disposed one at each of two ends of the wide portion 80a1 of the second insulating member body portion 80a in the lateral direction of the sealing plate 2. In addition, a pair of connection portions 80c extending from the second insulating member body portion 80a toward the sealing plate 2 are disposed one at each of two ends of the wide portion 80a1 of the second insulating member body portion 80a in the lateral direction of the sealing plate 2. The side walls 80b and the connection portions 80c are preferably spaced from each other in the longitudinal direction of the sealing plate 2. Consequently, it is possible to easily deform the pair of connection portions 80c, and it is thus possible to prevent with certainty the second insulating member 80 from being damaged or broken when the connection portions 80*c* are connected to the internal insulating member 12, as the first insulating member.

Upper ends of the side walls 80*b* are preferably in contact with the inner surface of the sealing plate 2. The height (length from the second insulating member body portion 80*a* to the upper ends of the side walls 80*b*) of the side walls 80*b* may be set to be larger than the height (length from the second insulating member body portion 80*a* to the upper ends of the connection portions 80*c*) of the connection portions 80*c*.

The connection portions 80*c* of the second insulating member 80 each include a vertical wall 80*c*1 extending from the second insulating member body portion 80*a* of the second insulating member 80 toward the sealing plate 2, and a projecting portion 80*c*2 projecting from an inside surface of the vertical wall 80*c*1 toward the internal insulating member 12, as the first insulating member. The projecting portion 80*c*2 is fitted into the connection recessed portion 12*e* of the internal insulating member 12, as the first insulating member. Consequently, the internal insulating member 12, as the first insulating member, and the second insulating member 80 are connected to each other. The first side walls 12*b* of the internal insulating member 12, as the first insulating member, may each include a connection recessed portion in an end portion on the side of the sealing plate 2, and the projecting portions 80*c*2 may be disposed between the internal insulating member 12, as the first insulating member, and the sealing plate 2.

<Production of Electrode Body>

The first positive electrode tab group 40*a*, the second positive electrode tab group 40*b*, the first negative electrode tab group 50*a*, and the second negative electrode tab group 50*b* are curved such that an upper surface of the first electrode body element 3*a* and an upper surface of the second electrode body element 3*b* in FIG. 10 are in contact with each other directly or via another member. Consequently, the first electrode body element 3*a* and the second electrode body element 3*b* are integrated together into a single body as the electrode body 3. The first electrode body element 3*a* and the second electrode body element 3*b* are preferably integrated together with a tape or the like into a single body. Alternatively, the first electrode body element 3*a* and the second electrode body element 3*b* are preferably integrated together into a single body by being disposed in the insulating sheet 14 that is molded into a box shape or a bag shape.

<Assembly of Rectangular Secondary Battery>

The electrode body 3 attached to the sealing plate 2 is covered with the insulating sheet 14 and inserted into the rectangular casing 1. The insulating sheet 14 is preferably formed by bending and molding a material on a flat plate into a box shape or a bag shape. Next, the sealing plate 2 and the rectangular casing 1 are joined to each other by laser welding or the like to seal the opening of the rectangular casing 1. Next, a nonaqueous electrolytic solution containing an electrolyte solvent and an electrolyte salt is injected into the battery case 100 through the electrolytic solution injection hole 15 provided in the sealing plate 2. Next, the electrolytic solution injection hole 15 is sealed with the sealing plug 16.

<Rectangular Secondary Battery 20>

In the rectangular secondary battery 20, the second insulating member 80 is connected to the internal insulating member 12, as the first insulating member, fixed to the sealing plate 2. Accordingly, it is possible to suppress the second insulating member 80 from moving by a large amount in the battery case 100 when vibrations or an impulse is applied to the rectangular secondary battery 20. Accordingly, it is possible to prevent with certainty an unexpected short-circuit that may occur due to positional displacement of the second insulating member 80. Moreover, it is possible to prevent the second insulating member 80 from damaging the positive electrode tabs 40 or the negative electrode tabs 50 as a result of the second insulating member 80 moving inside the battery case 100.

Preferably, one of the narrow portions 80*a*2 of the second insulating member 80 is disposed between the first positive electrode tab group 40*a* and the second positive electrode tab group 40*b*, and the other of the narrow portions 80*a*2 of the second insulating member 80 is disposed between the first negative electrode tab group 50*a* and the second negative electrode tab group 50*b*. The wide portion 80*a*1 of the second insulating member 80 is preferably disposed between the first positive electrode tab group 40*a* and the second positive electrode tab group 40*b*, and the first negative electrode tab group 50*a* and the second negative electrode tab group 50*b* in the longitudinal direction of the sealing plate 2. With such a configuration, it is possible to prevent with increased certainty the second insulating member 80 from damaging the tabs. The second insulating member 80 does not necessarily include the wide portion and the narrow portions.

The pair of side walls 80*b* extending from the second insulating member body portion 80*a* toward the sealing plate 2 are disposed one at each of two ends of the wide portion 80*a*1 of the second insulating member body portion 80*a* of the second insulating member 80 in the lateral direction of the sealing plate 2. With such a configuration, it is possible to ensure with certainty a gas flow path between the second insulating member body portion 80*a* of the second insulating member 80 and the sealing plate 2. In other words, it is possible to prevent with increased certainty the second insulating member body portion 80*a* from closing the gas discharge valve 17. Accordingly, it is possible to prevent the second insulating member 80 from impeding gas discharge from the gas discharge valve 17. In addition, it is possible to prevent the second insulating member 80 from coming into contact with the gas valve.

In the longitudinal direction of the sealing plate 2, the length of the side walls 80*b* is preferably shorter than the length of the second insulating member body portion 80*a*. Consequently, it is possible to more smoothly discharge gas generated inside the electrode body 3 to outside the battery case 100 when the gas discharge valve 17 is activated.

The side wall 80*b* and the connection portion 80*c* are not necessarily provided separately. For example, in the second insulating member 80, a projecting portion may be provided on the side wall 80*b* and may be used as a connection portion to be connected to the internal insulating member 12, as the first insulating member.

The internal insulating member 12, as the first insulating member, and the second insulating member 80 are preferably made of resin and may be made of, for example, polypropylene, polyethylene, perfluoroalkoxy alkane (PFA), polytetrafluoroethylene (PTFE), ethylene-tetrafluoroethylene copolymer (ETFE), or the like.

Figure 13:
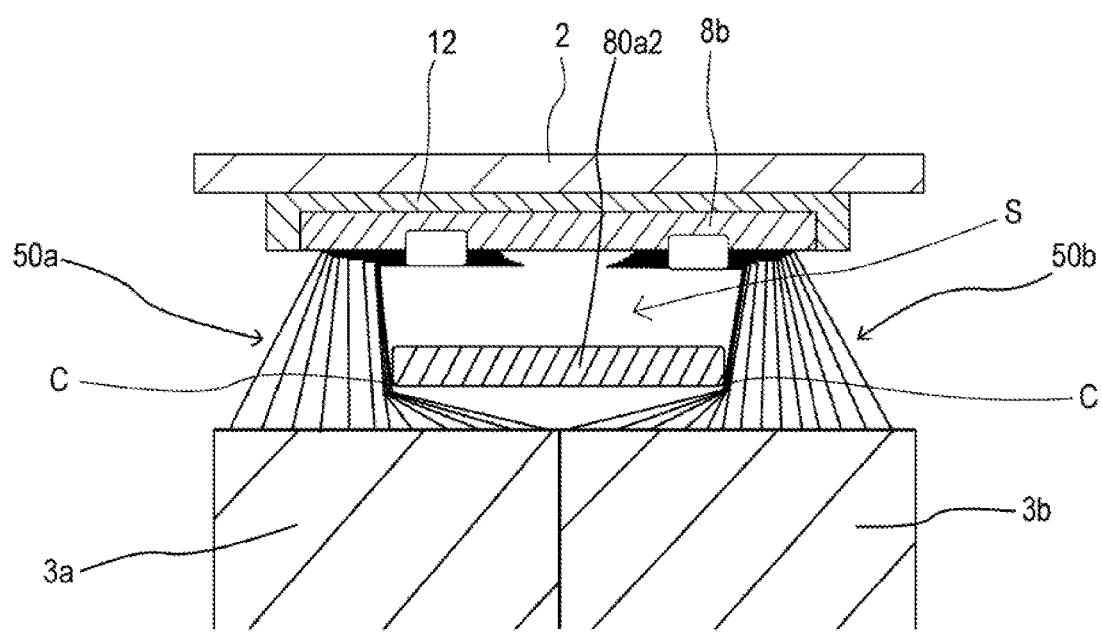
FIG. 13 is a sectional view in the lateral direction of the sealing plate in the vicinity of a connected portion at which a negative electrode tab and the second negative electrode current collector are connected to each other.

FIG. 13 is a sectional view in the lateral direction of the sealing plate 2 in the vicinity of a connected portion at which the first negative electrode tab group 50*a* and the second negative electrode tab group 50*b* are connected to the second negative electrode current collector 8*b*. As illustrated in FIG. 13, the first negative electrode tab group 50*a* of the first electrode body element 3*a* and the second negative electrode tab group 50*b* of the second electrode body element 3*b* are each connected to the second negative electrode current collector 8*b* by welding. The narrow portions 80*a*2 of the second insulating member 80 are disposed between the first negative electrode tab group 50*a* and the second negative electrode tab group 50*b*.

With such a configuration, it is possible to ensure a space S between the second negative electrode current collector 8*b* and a base portion of the first negative electrode tab group 50*a* and between the second negative electrode current collector 8*b* and a base portion of the second negative electrode tab group 50*b*. The space S serves as a flow path for gas generated inside the electrode body 3 to the gas discharge valve 17. Therefore, according to the aforementioned configuration, it is possible to smoothly discharge gas to outside the battery case when an abnormality occurs in the rectangular secondary battery, and the rectangular secondary battery thus has increased reliability.

In the narrow portions 80*a*2 of the second insulating member 80, corner portions C that face the first negative electrode tab group 50*a* or the second negative electrode tab group 50*b* are preferably chamfered. Consequently, it is possible to prevent with certainty the narrow portions 80*a*2 of the second insulating member 80 from damaging the first negative electrode tab group 50*a* or the second negative electrode tab group 50*b*.

As with on the negative electrode side, on the positive electrode side, the narrow portions 80*a*2 of the second insulating member 80 are disposed between the first positive electrode tab group 40*a* of the first electrode body element 3*a* and the second positive electrode tab group 40*b* of the second electrode body element 3*b*. Consequently, it is possible to ensure a space between the second positive electrode current collector 6*b* and a base portion of the first positive electrode tab group 40*a* and between the second positive electrode current collector 6*b* and a base portion of the second positive electrode tab group 40*b*.

In the rectangular secondary battery 20, a portion (the current collector second region 8*b*2 of the second negative electrode current collector 8*b*) of the negative electrode current collecting member 8 is disposed at a location that is between the gas discharge valve 17 and the electrode body 3 and that faces the gas discharge valve 17. Accordingly, it is possible to suppress high-temperature molten materials, sparks, and the like generated at the electrode body 3 from erupting from the gas discharge valve 17. The second negative electrode current collector 8*b* is preferably made of copper, a copper alloy, nickel, a nickel alloy, iron, an iron alloy, such as stainless steel, or the like.

In the direction perpendicular to the sealing plate 2, the distance between the sealing plate 2 and the current collector first region 8*b*1 is smaller than the distance between the sealing plate 2 and the current collector second region 8*b*2. With such a configuration, it is possible to ensure a space between the gas discharge valve 17 and the current collector second region 8*b*2. The negative electrode tabs 50 connected to the current to the current collector first region 8*b*1 are disposed in a space adjacent to the current collector second region 8*b*2. It is thus possible to efficiently utilize the space inside the battery case 100. Accordingly, the secondary battery has increased energy density and increased reliability.

Figure 14:
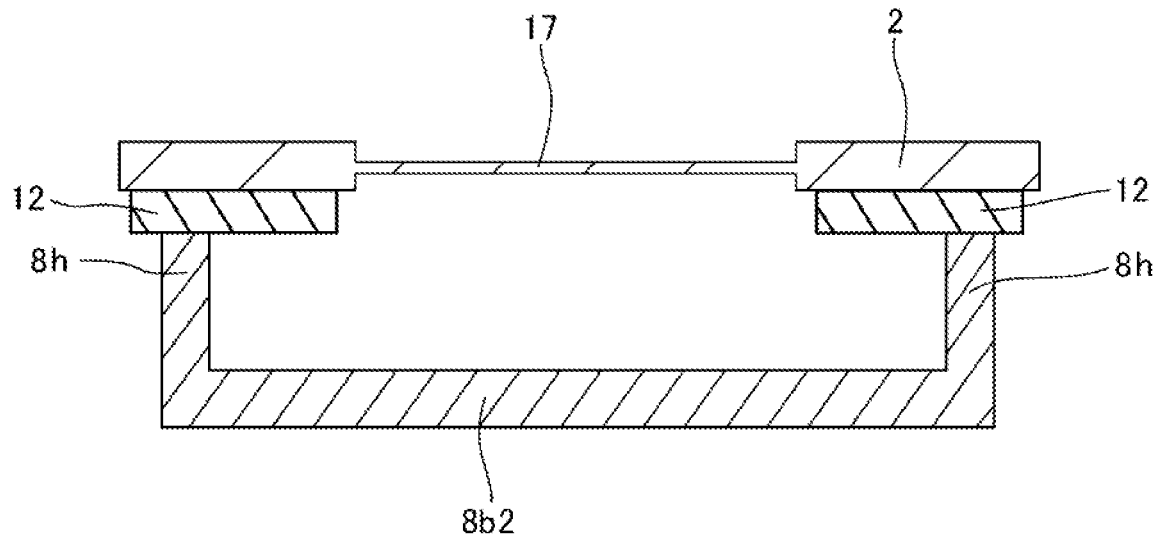
FIG. 14 is a sectional view in the lateral direction of the sealing plate, illustrating a gas discharge valve and a current collector second region of the second negative electrode current collector.

FIG. 14 is a sectional view in the lateral direction of the sealing plate 2, illustrating the gas discharge valve 17 and the second negative electrode current collector 8*b* of the current collector second region 8*b*2. The current collector second region 8*b*2 includes the shielding member wall portions 8*h* extending from the current collector second region 8*b*2 toward the sealing plate 2. It is thus possible to prevent with certainty the current collector second region 8*b*2 from closing the gas discharge valve 17 as a result of the current collector second region 8*b*2 moving toward the gas discharge valve 17. Due to the shielding member wall portions 8*h* being made of metal, the shielding member wall portions 8*h* do not easily melt, even when the rectangular secondary battery 20 has a high temperature. The internal insulating member 12 is disposed between the sealing plate 2 and the shielding member wall portions 8*h*. Consequently, it is possible to prevent the shielding member wall portions 8*h* from coming into direct contact with the sealing plate 2.

In addition, the second negative electrode current collector 8*b* includes the vent hole 8*g*. Consequently, air is more smoothly discharged. The vent hole 8*g* is preferably disposed at a location so as not to overlap the gas discharge valve 17 when the rectangular secondary battery 20 is viewed in the direction perpendicular to the sealing plate 2.

In the current collector second region 8*b*2, the portion that faces the gas discharge valve 17 and that serves as the shielding member preferably has a width in the lateral direction of the sealing plate smaller than the width of the current collector first region 8*b*1. Consequently, it is possible to suppress an increase in the weight of the secondary battery without increasing internal resistance of the rectangular secondary battery 20.

The current collector second region 8*b*2 preferably includes a constricted portion 8*i* at which the width in the lateral direction of the sealing plate 2 decreases. A slit-shaped gap formed on each of two sides of the constricted portion 8*i* can serve as a gas passage.

Figure 15:
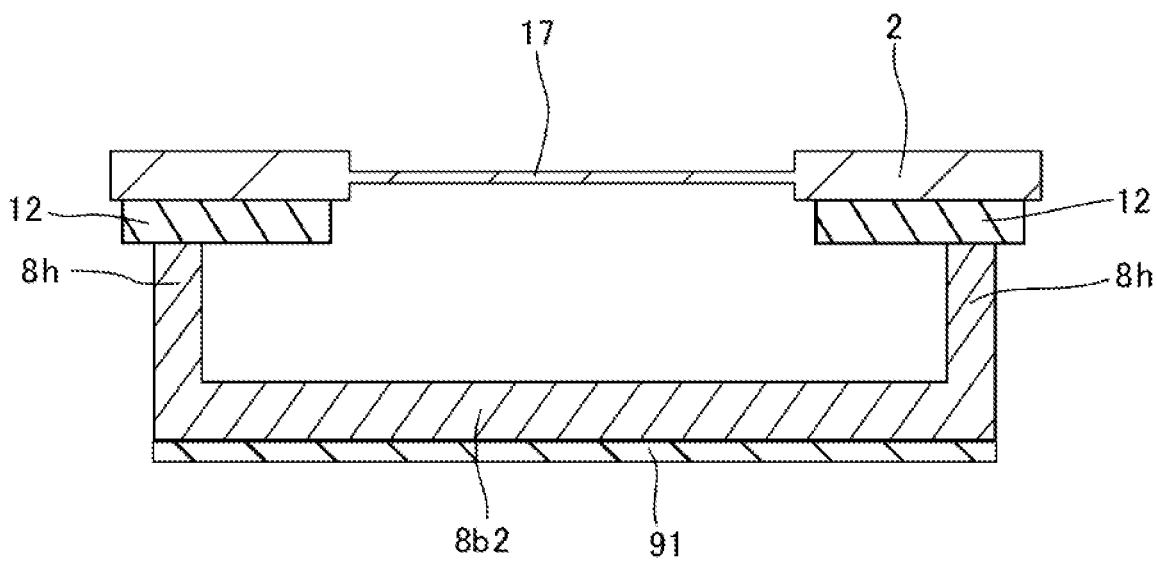
FIG. 15 is a sectional view in the lateral direction of the sealing plate, illustrating the gas discharge valve and the current collector second region of the second negative electrode current collector of the rectangular secondary battery according to a modification.

The second insulating member 80 is not an essential component; the second insulating member 80 may not be disposed. In such a case, as illustrated in FIG. 15, it is preferable that an insulating layer 91 be disposed on a surface of the current collector second region 8*b*2 of the second negative electrode current collector 8*b*, the surface being on the side of the electrode body 3. The insulating layer 91 may be formed by applying a resin or sticking an insulating tape onto the current collector second region 8*b*2.

The insulating member disposed between the current collector second region 8*b*2 of the second negative electrode current collector 8*b* and the sealing plate 2 may not be a portion of the internal insulating member 12 and may be a component different from the internal insulating member 12. In this case, the current collector second region 8*b*2 may be resin-molded so that the current collector second region 8*b*2 of the second negative electrode current collector 8*b* is disposed in a resin member.

<<Modification>>

Figure 16:
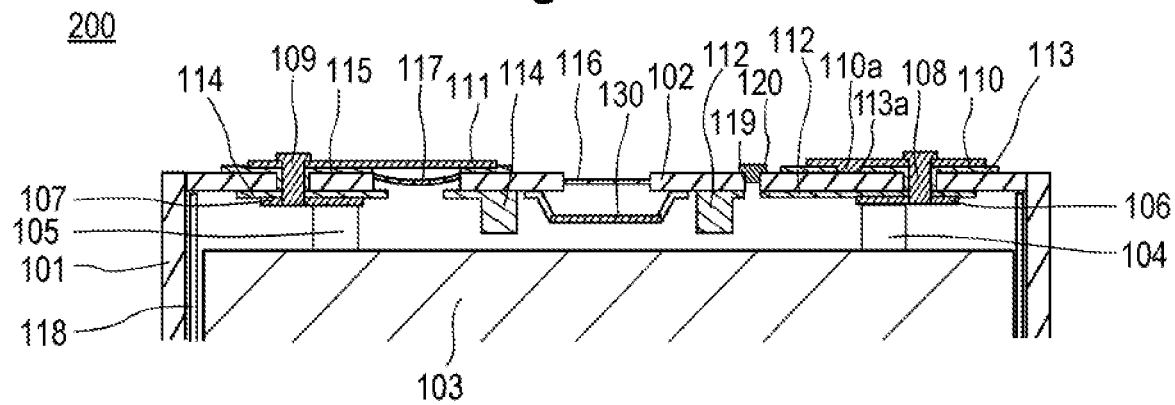
FIG. 16 is a sectional view in the vicinity of the sealing plate of the rectangular secondary battery according to a modification.

FIG. 16 is a sectional view in the vicinity of a sealing plate of a rectangular secondary battery 200 according to a modification, in the longitudinal direction of the sealing plate.

An electrode body 103 that includes positive electrode plates and negative electrode plates is disposed in a rectangular casing 101 that includes an opening. The opening of the rectangular casing 101 is sealed with a sealing plate 102. The rectangular casing 101 and the sealing plate 102 constitute a battery case. An insulating sheet 118 that is molded into a box shape is disposed between the rectangular casing 101 and the electrode body 103. The rectangular casing 101 and the sealing plate 102 are preferably constituted by aluminum, an aluminum alloy, stainless steel, or the like. The electrode body 103 may have, for example, the configuration in the aforementioned embodiment.

A positive electrode tab 104 connected to the positive electrode plates is connected to, a positive electrode external terminal 108 via a positive electrode current collecting member 106. A positive electrode external conductive member 110 is connected, outside the battery case, to the positive electrode external terminal 108. An internal insulating member 112 made of resin is disposed between the sealing plate 102 and the positive electrode current collecting member 106. An external insulating member 113 made of resin is disposed between the positive electrode external conductive member 110 and the sealing plate 102.

The external insulating member 113 includes an opening 113a. A connection projection 110a of the positive electrode external conductive member 110 is disposed in the opening 113a, and the Connection projection 110a of the positive electrode external conductive member 110 is in contact with the sealing plate 102. Consequently, the sealing plate 102 is electrically connected to the positive electrode plates.

A negative electrode tab 105 connected to the negative electrode plates is connected to a negative electrode external terminal 109 via a negative electrode current collecting member 107. A negative electrode external conductive member 111 is connected, outside the battery case, to the negative electrode external terminal 109. An internal insulating member 114 made of resin is disposed between the sealing plate 102 and the negative electrode current collecting member 107. An external insulating member 115 made of resin is disposed between the negative electrode external conductive member 111 and the sealing plate 102.

The sealing plate 102 includes a gas discharge valve 116 that ruptures when the pressure inside the battery case has a predetermined value or more to discharge gas inside the battery case to outside the battery case. The sealing plate 102 includes a deformation plate 117 that deforms to be inverted when the pressure inside the battery case has a predetermined value or more. Upon deformation of the deformation plate 117, the deformation plate 117 comes into contact with the negative electrode external conductive member 111, and the positive and negative electrodes are short-circuited.

With such a configuration, when the pressure inside the battery case increases as a result of the rectangular secondary battery 200 entering an overcharged state, the positive and negative electrodes are short-circuited, and it is possible to suppress overcharging from further progressing. Moreover, it is possible to discharge energy inside the electrode body 103. Preferably, the positive electrode current collecting member 106 or the positive electrode external conductive member 110 includes a fuse portion, and the fuse portion melts and breaks due to short-circuit current. The pressure inside the battery case with which a short-circuit of the positive and negative electrodes occurs as a result of deformation of the deformation plate 117 is set to a value lower than a pressure with which the gas discharge valve 17 ruptures.

The sealing plate 102 includes an electrolytic solution injection hole 119. The electrolytic solution injection hole 119 is sealed with a sealing plug 120 after an electrolytic solution is injected into the rectangular casing 101.

A shielding member 130 made of metal is connected to a surface of the sealing plate 102 on the side of the electrode body 103. The shielding member 130 is disposed in the battery case so as to face the gas discharge valve 116. Consequently, it is possible to suppress high-temperature molten materials, sparks, and the like generated at the electrode body 3 from erupting from the gas discharge valve 116. The shielding member 130 is preferably made of copper, a copper alloy, nickel, a nickel alloy, iron, an iron alloy, such as stainless steel, aluminum, an aluminum alloy, or the like. The shielding member 130 is preferably made of a metal that has a melting point higher than the melting point of the metal constituting the sealing plate 102.

Figure 17:
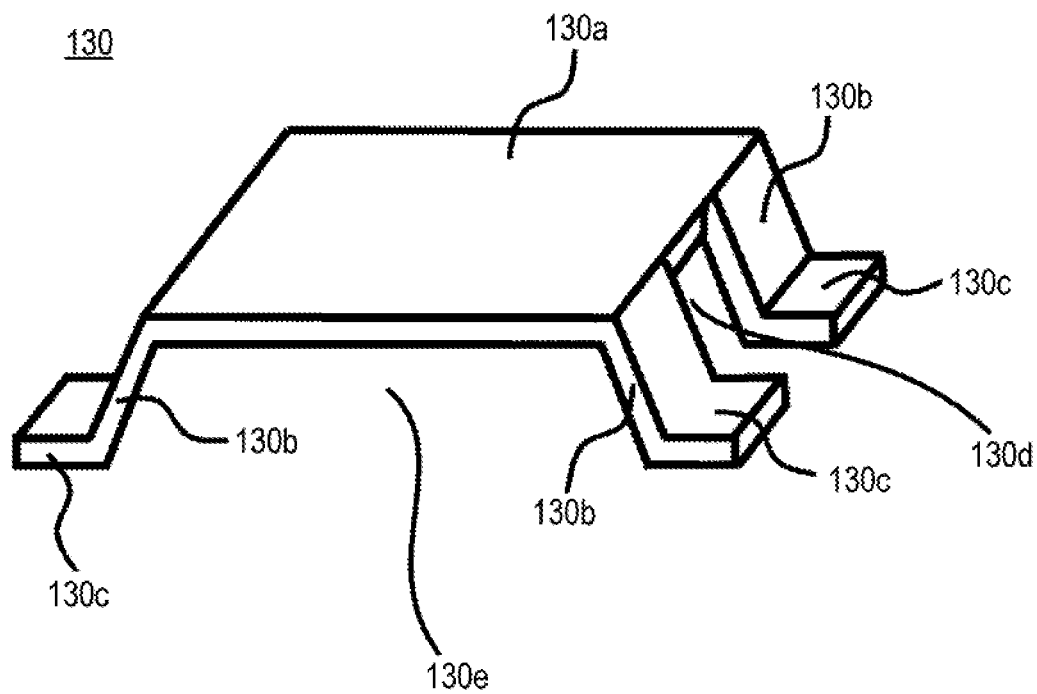
FIG. 17 is a perspective view of a shielding member of the rectangular secondary battery according to a modification.

FIG. 17 is a perspective view of the shielding member 130. In FIG. 17, the side of the electrode body 103 is illustrated on the upper side, and the side of the sealing plate 102 is illustrated on the lower side.

The shielding member 130 includes a shielding member body portion 130a, leg portions 130b each extending from an end portion of the shielding member body portion 130a toward the sealing plate 102, and shielding member connection portions 130c disposed on the leading end side of respective leg portions 130b. The shielding member body portion 130a is disposed so as to face the gas discharge valve 116. The shielding member connection portions 130c are connected to the sealing plate 102. Due to the leg portions 130b, the shielding member body portion 130a is spaced from the sealing plate 102.

The leg portions 130b are formed at four portions, and a gap 130d and a gap 130e are formed between the leg portions 130b. In FIG. 17, the gap 130d is provided on each of the left side and the right side, and the gap 130e is provided on each of the front side and the deep side.

The method of connecting the shielding member 130 and the sealing plate 102 to each other is not particularly limited. For example, welding, sticking with an adhesive, fitting, crimping, and the like are usable for the connection.

Figure 18:
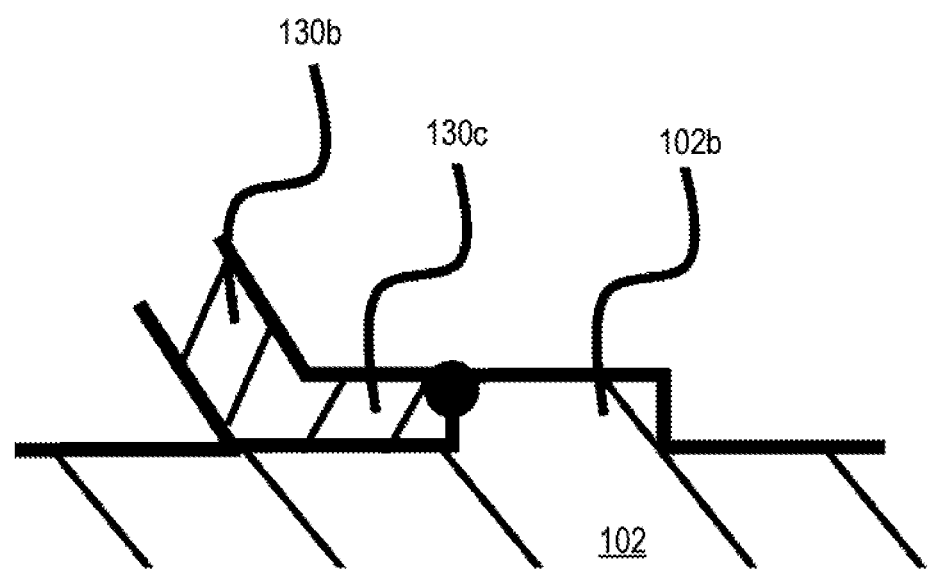
FIG. 18 is a sectional view of a connected portion at which the shielding member and the sealing plate of the rectangular secondary battery according to a modification are connected to each other.

FIG. 18 is a sectional view in the longitudinal direction of the sealing plate 102 in the vicinity of a connected portion at which the shielding member connection portion 130c of the shielding member 130 and the sealing plate 102 are connected to each other. FIG. 18 is a view illustrating an example in which the sealing plate 102 and the shielding member 130 are connected to each other by welding. The surface of the sealing plate 102 on the side of the electrode body 103 includes a projection 102b, and the shielding member connection portions 130c of the shielding member 130 and the projection 102b are connectable to each other by welding with laser or the like. The projection 102b is preferably disposed on the side of end portions of the shielding member connection portions 130c of the shielding member 130 opposite to the side where the leg portions 130b are located. Preferably, a plurality of the projections 102b are disposed at locations respectively in contact with the plurality of shielding member connection portions 130c of the shielding member 130.

Figure 19:
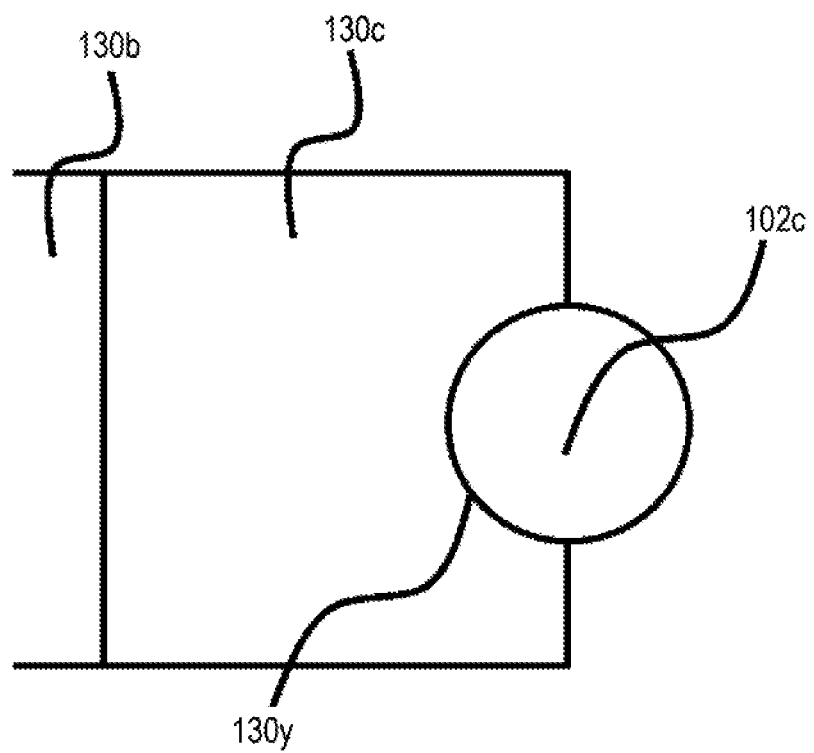
FIG. 19 is a plan view of the connected portion at which the shielding member and the sealing plate of the rectangular secondary battery according to a modification are connected to each other.

FIG. 19 is a view illustrating a method of connecting the shielding member 130 and the sealing plate 102 to each other, and the view illustrates the surface of the sealing plate 102 on the side of the electrode body 103. As illustrated in FIG. 19, the shielding member connection portion 130c of the shielding member 130 may include a notch 130y, and the shielding member connection portion 130c and the projection 102c may be connected to each other by welding with a projection 102c provided on the sealing plate 102 being fitted into the notch 130y.

Figure 20:
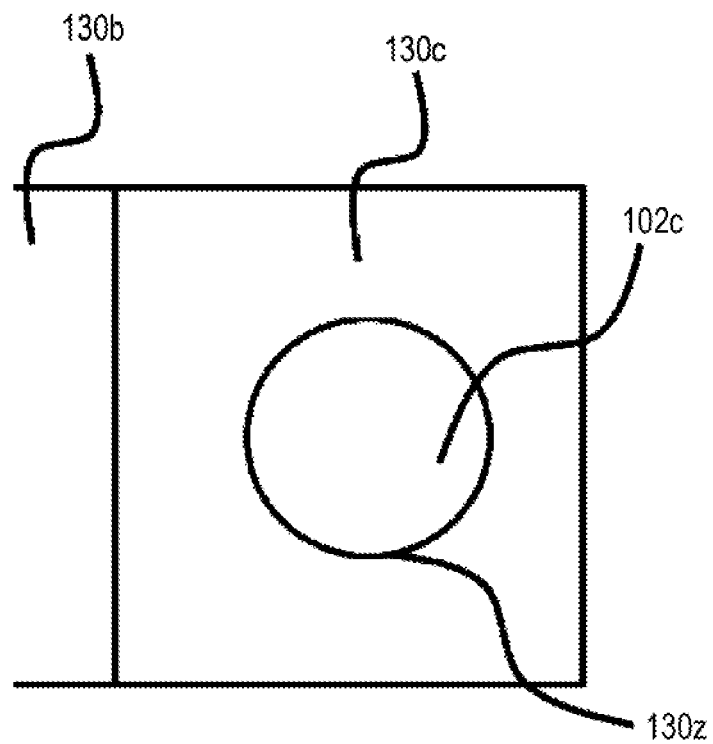
FIG. 20 is a plan view of the connected portion at which the shielding member and the sealing plate of the rectangular secondary battery according to a modification are connected to each other.

FIG. 20 is a view illustrating a method of connecting the shielding member 130 and the sealing plate 102 to each other, and the view illustrates the surface of the sealing plate 102 on the side of the electrode body 103. As illustrated in FIG. 20, the shielding member connection portion 130c of the shielding member 130 may include an opening 130z, and the shielding member connection portion 130c and the projection 102c may be connected to each other by welding with the projection 102c provided on the sealing plate 102 being disposed in the opening 130z.

In the form illustrated in FIG. 19 or FIG. 20, as an alternative to welding or in addition to welding, crimping is used to fix the projection 102c onto the shielding member connection portion 130c. Alternatively, the shielding member connection portion 130c may be deformed to be fixed to the projection 102c.

The method in which the projection 102c is crimped or the method in which the shielding member connection portion 130c is deformed enables connection between the shielding member 130 and the sealing plate 102 to be performed easily, even when welding between the shielding member 130 and the sealing plate 102 is difficult.

Figure 21:
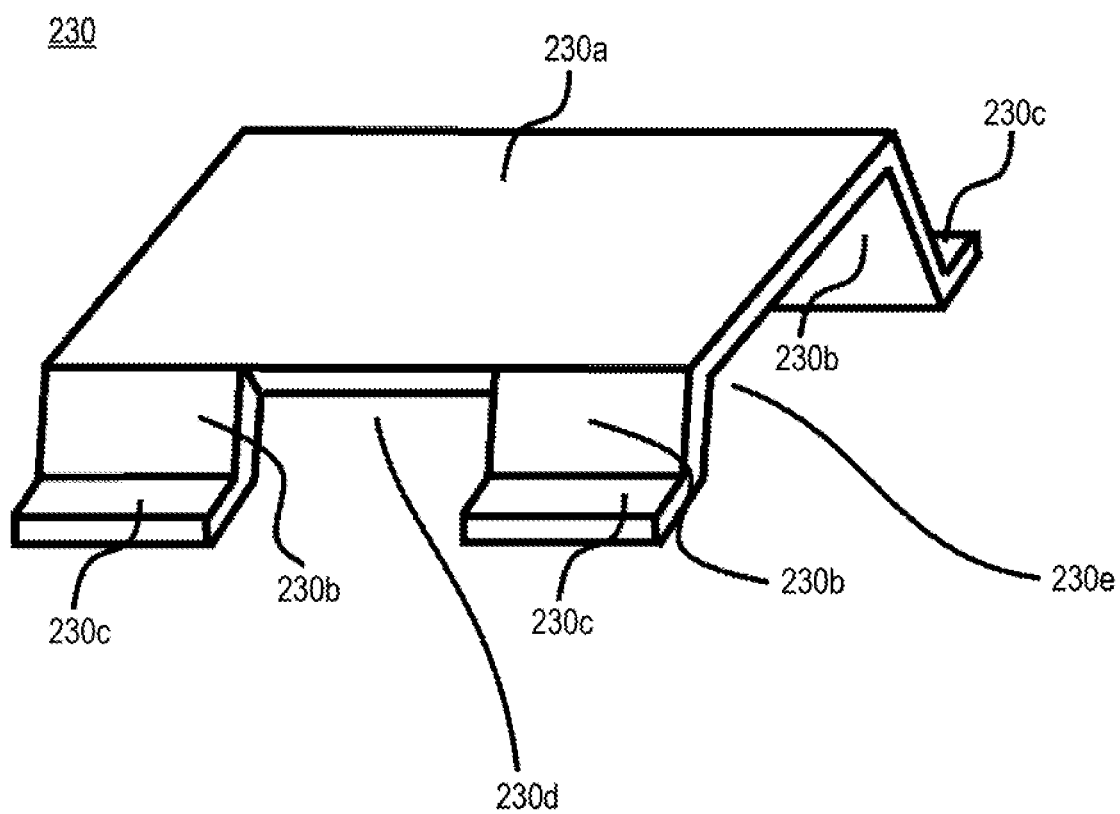
FIG. 21 is a perspective view of the shielding member of the rectangular secondary battery according to a modification.

The shielding member may have the shape illustrated in FIG. 21. FIG. 21 is a perspective view of a shielding member 230, and the view corresponds to FIG. 17. In a shielding member body portion 230a, two leg portions 230b extend from each of two end portions in the lateral direction of the sealing plate toward the sealing plate. The leg portions 230b each include a shielding member connection portion 230c, and the shielding member connection portion 230c is connected to the sealing plate. A gap 230d and a gap 230e are formed between the leg portions 230b.

Figure 22:
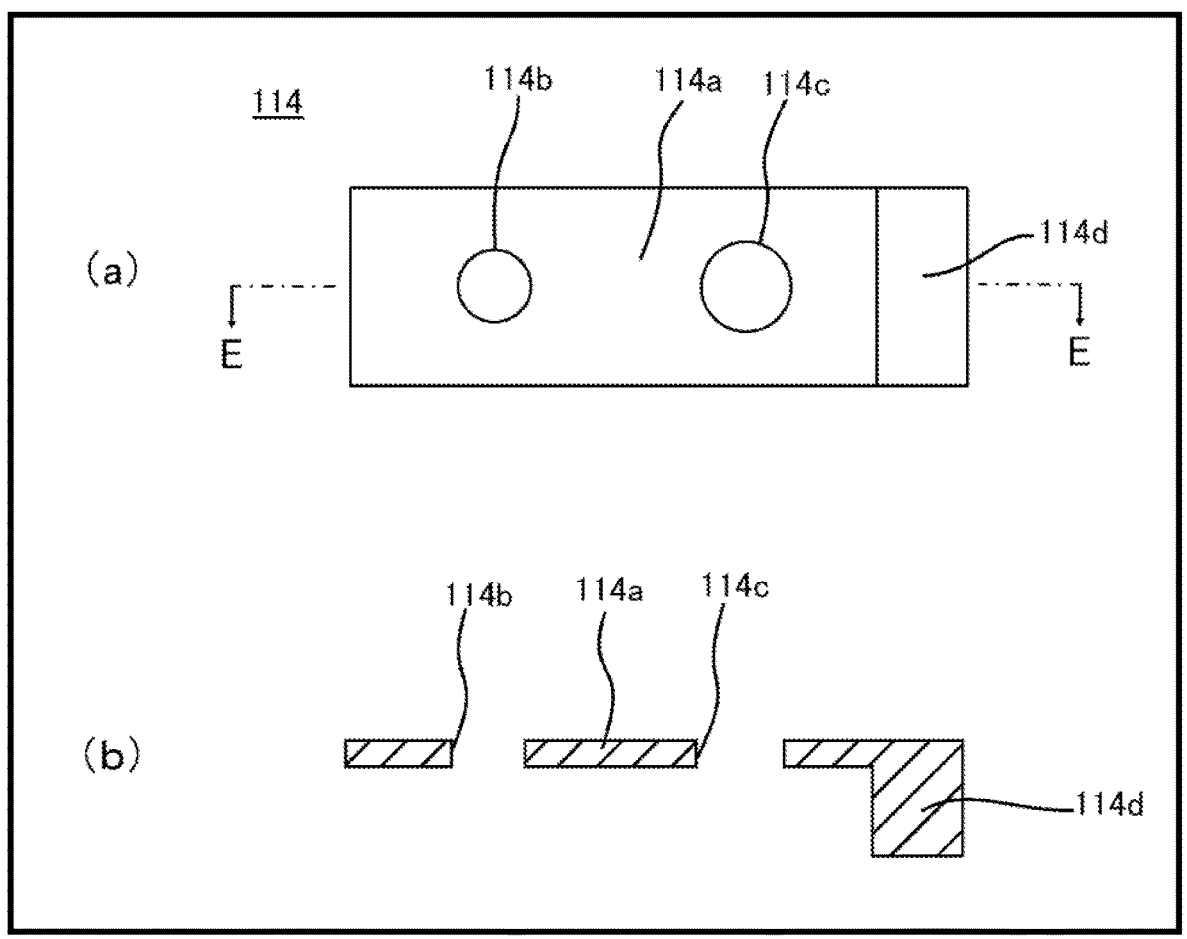
FIG. 22 is a plan view and a sectional view of an internal insulating member on the negative electrode side of the rectangular secondary battery according to a modification.

FIG. 22 is a view illustrating the internal insulating member 114 on the negative electrode side. In FIG. 22, (a) is a view illustrating a surface of the internal insulating member 114 on the side of the electrode body 103, and (b) is a sectional view taken along line E-E in (a).

The internal insulating member 114 includes an insulating member body portion 114a disposed along the inner surface of the sealing plate 102. The insulating member body portion 114a includes a terminal insertion hole 114b into which the negative electrode external terminal 109 is inserted. In addition, the insulating member body portion 114a includes a through hole 114c at a location that faces the deformation plate 117 provided in the sealing plate 102.

As illustrated in FIG. 16 and FIG. 22, the insulating member body portion 114a includes a projecting portion 114d projecting toward the electrode body 103. An end portion of the projecting portion 114d on the side of the electrode body 103 is preferably located closer than an end portion of the shielding member 130 on the side of the electrode body 103 to the electrode body 103. With such a configuration, it is possible to prevent the electrode body 103 from coming into contact with the shielding member 130, even when the electrode body 103 moved toward the sealing plate 102. The projecting portion 114d is preferably disposed in the vicinity of the shielding member 130.

The projecting portion 114d of the internal insulating member 114 is not an essential component. An insulating layer may be formed on a surface of the shielding member body portion 130a of the shielding member 130 on the side of the electrode body 103.

Figure 23:
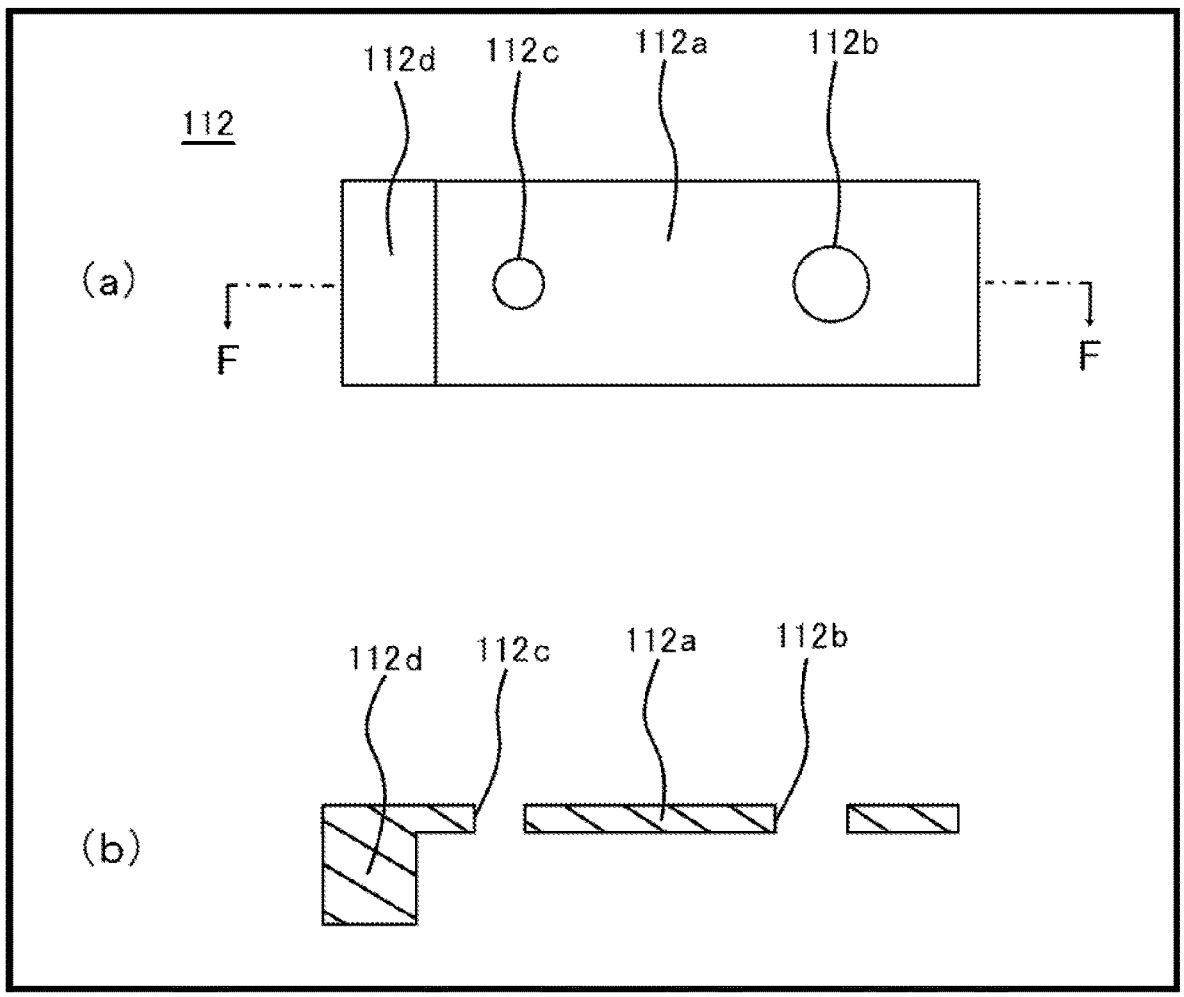
FIG. 23 is a plan view and a sectional view of an internal insulating member on the positive electrode side of the rectangular secondary battery according to a modification.

FIG. 23 is a view illustrating the internal insulating member 112 on the positive electrode side. In FIG. 23, (a) is a view illustrating a surface of the internal insulating member 112 on the side of the electrode body 103, and (b) is a sectional view taken along line F-F in (a).

The internal insulating member 112 includes an insulating member body portion 112a disposed along the inner surface of the sealing plate 102. The insulating member body portion 112a includes a terminal insertion hole 112b into which the positive electrode external terminal 108 is inserted. In addition, the insulating member body portion 112a includes a through hole 112c at a location that faces the electrolytic solution injection hole 119 provided in the sealing plate 102.

As illustrated in FIG. 16 and FIG. 23, the insulating member body portion 112a includes a projecting portion 112d projecting toward the electrode body 103. An end portion of the projecting portion 112d on the side of the electrode body 103 is preferably located closer than the end portion of the shielding member 130 on the side of the electrode body 103 to the electrode body 103. With such a configuration, it is possible to prevent the electrode body 103 from coming into contact with the shielding member 130, even when the electrode body 103 moved toward the sealing plate 102. The projecting portion 112d is preferably provided in the vicinity of the shielding member 130.

Figure 24:
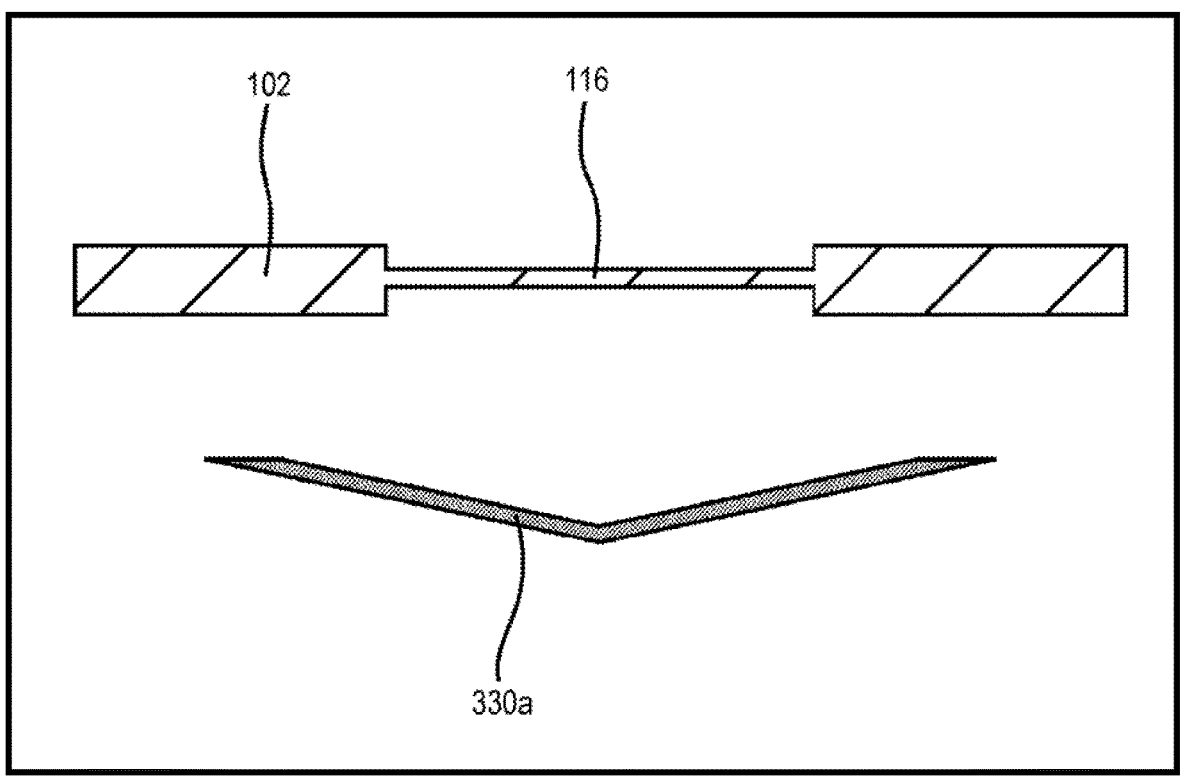
FIG. 24 is a sectional view of the sealing plate and the shielding member of the rectangular secondary battery according to a modification.

FIG. 24 is a sectional view in the lateral direction of the sealing plate 102, illustrating the sealing plate 102, the gas discharge valve 116, and a shielding member body portion 330a of the shielding member of a rectangular secondary battery according to another modification. As illustrated in FIG. 24, a cross-section of a portion of the shielding member facing the gas discharge valve 116 may have a V-shape. Such a shape enables gas to be more smoothly discharged.

<Other>

When the electrode body is a stack-type electrode body that includes a plurality of positive electrode plates and a plurality of negative electrode plates or when the electrode body is a wound electrode body whose winding axis is arranged perpendicular to the sealing plate, leading end portions of the positive electrode plates, leading end portions of the negative electrode plates, and leading end portions of separators are preferably located on the side of the sealing plate in the electrode body. With such a configuration, when the sealing plate includes an electrolytic solution injection hole, performance in injection of an electrolytic solution into the electrode body is improved.

In such a case, end portions of the separators on the side of the sealing plate preferably project more toward the sealing plate 2 than an end portion of a negative-electrode-active-material mixture layer of the negative electrode plates on the side of the sealing plate. In addition, in the electrode body, the end portions of the separators on the side of the sealing plate preferably project more toward the sealing plate than an end portion of a positive-electrode-active-material mixture layer of the positive electrode plates on the side of the sealing plate. Preferably, the positive electrode plates and the separators are bonded to each other with adhesive layers, and the negative electrode plates and the separators are bonded to each other with adhesive layers. With such a configuration, it is possible to prevent with certainty the positive-electrode-active-material mixture layer or the negative-electrode-active-material mixture layer from being damaged as a result of the positive-electrode-active-material mixture layer and the negative-electrode-active-material mixture layer coming into contact with the second insulating member.

In the aforementioned embodiment, an example in which the electrode body 3 is constituted by the two electrode body elements 3a and 3b is presented; however, the electrode body 3 is not limited thereto. The electrode body 3 may be a single stack-type electrode body. In addition, the electrode body 3 may be a single wound electrode body that includes a long positive electrode plate and a long negative electrode plate that are wound with a separator interposed therebetween. Each of the two electrode body elements 3a and 3b is not limited to the stack-type electrode body and may be a wound electrode body that includes a long positive electrode plate and a long negative electrode plate that are wound with a separator interposed therebetween.

In the aforementioned embodiment, an example in which the stack-type electrode body is used is presented; however, a wound electrode body may be used. In addition, orientation of the wound electrode body disposed in the rectangular casing is not particularly limited.

In the aforementioned embodiment, an example in which the first insulating member and the second insulating member are connected to each other is presented; however, the first insulating member and the second insulating member may not be connected to each other. In addition, the second insulating member may not be used.

The energy density of the rectangular secondary battery is preferably 300 Wh/L or more. The energy density of the rectangular secondary battery is obtained by (output [Wh] of rectangular secondary battery/volume [L] of rectangular secondary battery).

The battery capacity of the rectangular secondary battery is preferably 20 Ah or more and more preferably 30 Ah or more.

The present invention is effective, in particular, when end portions of the positive electrode plates and end portions of the negative electrode plates are disposed on the side of the sealing plate.

REFERENCE SIGNS LIST 20 rectangular secondary battery
1 rectangular casing
2 sealing plate
2a positive-electrode-terminal attachment hole
2b negative-electrode-terminal attachment hole
100 battery case
3 electrode body
3a first electrode body element
3b second electrode body element
4 positive electrode plate
4a positive electrode core
4b positive-electrode-active-material mixture layer
4d positive electrode protection layer
40 positive electrode tab
40a first positive electrode tab group
40b second positive electrode tab group
5 negative electrode plate
5a negative electrode core
5b negative-electrode-active-material mixture layer
50 negative electrode tab
50a first negative electrode tab group
50b second negative electrode tab group
6 positive electrode current collecting member
6a first positive electrode current collector
6c thin-wall portion
6x current collector projection
6w current collector second recessed portion
6b second positive electrode current collector
6b1 current collector first region
6b2 current collector second region
6b3 current collector third region
6e target hole
6f current collector first recessed portion
6y current collector opening
6z open portion
7 positive electrode external terminal
7a terminal sealing member
7x metal member
7y rubber member
7b terminal through hole
8 negative electrode current collecting member
8a first negative electrode current collector
8x current collector projection
8w current collector second recessed portion
8b second negative electrode current collector
8b1 current collector first region
8b2 current collector second region
8b3 current collector third region
8b4 current collector fourth region
8b5 current collector fifth region
8e target hole
8f current collector first recessed portion
8g vent hole
8h shielding member wall portion
8i constricted portion
8y current collector opening
9 negative electrode external terminal
10 internal insulating member
11 external insulating member
12 internal insulating member
12a first insulating member body portion
12b first side wall
12c second side wall
12d through hole
12e connection recessed portion
12f opening
13 external insulating member
14 insulating sheet
15 electrolytic solution injection hole
16 sealing plug
17 gas discharge valve
60 current interruption mechanism
61 conductive member
62 deformation plate
63 third insulating member
63b insulating member opening
63c insulating member projection
63x insulating member first region
63y insulating member second region
63z insulating member third region
70 fixed portion
80 second insulating member
80a second insulating member body portion
80a1 wide portion
80a2 narrow portion
80b side wall
80c connection portion
80c1 vertical wall
80c2 projecting portion
90 welded connection portion
91 insulating layer
200 rectangular secondary battery
101 rectangular casing
102 sealing plate
102b projection
102c projection
103 electrode body
104 positive electrode tab
105 negative electrode tab
106 positive electrode current collecting member
107 negative electrode current collecting member
108 positive electrode external terminal
109 negative electrode external terminal
110 positive electrode external conductive member
110a connection projection
111 negative electrode external conductive member
112 internal insulating member
112a insulating member body portion 112*b* terminal insertion hole
112*c* through hole
112*d* projecting portion
113 external insulating member
113*a* opening
114 internal insulating member
114*a* insulating member body portion
114*b* terminal insertion hole
114*c* through hole
114*d* projecting portion
115 external insulating member
116 gas discharge valve
117 deformation plate
118 insulating sheet
119 electrolytic solution injection hole
120 sealing plug
130 shielding member
130*a* shielding member body portion
130*b* leg portion
130*c* shielding member connection portion
130*d* gap
130*e* gap
130*z* opening
230 shielding member
230*a* shielding member body portion
230*b* leg portion
230*c* shielding member connection portion
230*d* gap
230*e* gap
330*a* shielding member body portion

The invention claimed is:

1. A rectangular secondary battery comprising:
an electrode body that includes a positive electrode plate and a negative electrode plate;
a rectangular casing that includes an opening and that contains the electrode body;
a sealing plate that includes a gas discharge valve and that seals the opening; and
a current collecting member that is electrically connected to the positive electrode plate or the negative electrode plate and that is disposed in the rectangular casing,
wherein a shielding member made of metal is disposed at a location that is between the gas discharge valve and the electrode body and that faces the gas discharge valve,
wherein the shielding member is a portion of the current collecting member,
wherein the positive electrode plate or the negative electrode plate includes a tab,
wherein the current collecting member includes a first region, a second region, and a third region,
wherein the tab is connected to the first region,
wherein the second region is disposed at a location that faces the gas discharge valve,
wherein the third region connects the first region and the second region to each other,
wherein, in a direction perpendicular to the sealing plate, a distance between the sealing plate and the first region is smaller than a distance between the sealing plate and the second region, and
wherein the current collecting member includes a vent hole that connects a space between the gas discharge valve and the second region and a space between the current collecting member and the electrode body to each other.

2. A rectangular secondary battery comprising:
an electrode body that includes a positive electrode plate and a negative electrode plate;
a rectangular casing that includes an opening and that contains the electrode body;
a sealing plate that includes a gas discharge valve and that seals the opening; and
a current collecting member that is electrically connected to the positive electrode plate or the negative electrode plate and that is disposed in the rectangular casing,
wherein a shielding member made of metal is disposed at a location that is between the gas discharge valve and the electrode body and that faces the gas discharge valve,
wherein the shielding member is a portion of the current collecting member,
wherein the positive electrode plate or the negative electrode plate includes a tab,
wherein the current collecting member includes a first region, a second region, and a third region,
wherein the tab is connected to the first region,
wherein the second region is disposed at a location that faces the gas discharge valve,
wherein the third region connects the first region and the second region to each other,
wherein, in a direction perpendicular to the sealing plate, a distance between the sealing plate and the first region is smaller than a distance between the sealing plate and the second region,
wherein a terminal is attached to the sealing plate,
wherein the current collecting member includes a first current collector and a second current collector,
wherein the second current collector includes the first region, the second region, and the third region,
wherein the first current collector is connected to the terminal and the second current collector,
wherein the second current collector further includes a fourth region, and
wherein, in the fourth region, the second current collector is connected to the first current collector.

3. The rectangular secondary battery according to claim 2, wherein, in the direction perpendicular to the sealing plate, the distance between the sealing plate and the first region is smaller than a distance between the sealing plate and the fourth region, and the distance between the sealing plate and the fourth region is smaller than the distance between the sealing plate and the second region.

\* \* \* \* \*